United States Patent
Yoshida et al.

(10) Patent No.: US 10,190,689 B2
(45) Date of Patent: Jan. 29, 2019

(54) SEAL RING

(71) Applicant: NOK CORPORATION, Tokyo (JP)

(72) Inventors: Yusuke Yoshida, Fujisawa (JP); Fangman Xu, Fujisawa (JP); Nozomu Suzuki, Fujisawa (JP); Norimasa Hosonuma, Fujisawa (JP); Shigenobu Honda, Fujisawa (JP); Kenichi Yoshimura, Fujisawa (JP); Yohei Sakai, Fujisawa (JP); Shota Toma, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/557,909

(22) PCT Filed: Mar. 10, 2016

(86) PCT No.: PCT/JP2016/057546
§ 371 (c)(1),
(2) Date: Sep. 13, 2017

(87) PCT Pub. No.: WO2016/148006
PCT Pub. Date: Sep. 22, 2016

(65) Prior Publication Data
US 2018/0051809 A1    Feb. 22, 2018

(30) Foreign Application Priority Data

Mar. 16, 2015 (JP) ................... 2015-052653
Mar. 16, 2015 (JP) ................... 2015-052675
Mar. 16, 2015 (JP) ................... 2015-052691

(51) Int. Cl.
*F16J 15/34* (2006.01)
*F16J 15/16* (2006.01)
(Continued)

(52) U.S. Cl.
CPC ............. *F16J 15/164* (2013.01); *F16J 15/18* (2013.01); *F16J 15/3244* (2013.01); *F16J 15/441* (2013.01)

(58) Field of Classification Search
CPC ........ F16J 15/164; F16J 15/18; F16J 15/3244; F16J 15/441
See application file for complete search history.

(56) References Cited

U.S. PATENT DOCUMENTS 4,082,296 A * 4/1978 Stein ................... F16J 15/3412
277/400
4,145,058 A * 3/1979 Hady .................... F16J 15/441
277/366
(Continued)

FOREIGN PATENT DOCUMENTS

CN     101395412 A    3/2009
CN     102483162 A    5/2012
(Continued)

OTHER PUBLICATIONS

Chinese Office Action dated Aug. 2, 2018 (corresponding to CN 201680013714.3).
(Continued)

*Primary Examiner* — Gilbert Y Lee
(74) *Attorney, Agent, or Firm* — Harness, Dickey & Pierce, P.L.C.

(57) ABSTRACT

A seal ring capable of stably reducing a rotational torque while preventing the leakage of sealed fluid. The seal ring includes: an abutment joint part (110) provided at one portion in a circumferential direction thereof; a plurality of dynamic pressure generation grooves (120) provided at intervals in the circumferential direction on a side of a sliding surface thereof sliding on a lateral wall surface of an annular groove; and foreign matter discharging grooves (130) that are provided between a region in which the (Continued)

plurality of dynamic pressure generation grooves (120) is arranged and the abutment joint part (110) in the circumferential direction on the side of the sliding surface sliding on the lateral wall surface, and that are capable of catching foreign matter intruding from the abutment joint part (110) and discharging the caught foreign matter to an outside of a sliding part between the seal ring and the lateral wall surface.

8 Claims, 23 Drawing Sheets

(51) Int. Cl.
*F16J 15/18* (2006.01)
*F16J 15/3244* (2016.01)
*F16J 15/44* (2006.01)

(56) References Cited

U.S. PATENT DOCUMENTS

| | | | |
|---|---|---|---|
| 6,575,470 B1 * | 6/2003 | Gacek | F16J 15/3412 277/399 |
| 2009/0051124 A1 | 2/2009 | Kakehi | |
| 2012/0018957 A1 | 1/2012 | Watanabe | |
| 2015/0048574 A1 | 2/2015 | Seki et al. | |
| 2015/0108720 A1 | 4/2015 | Seki et al. | |
| 2015/0204204 A1 | 7/2015 | Seki et al. | |
| 2017/0009889 A1 | 1/2017 | Seki et al. | |

FOREIGN PATENT DOCUMENTS

| | | |
|---|---|---|
| DE | 19713455 A1 | 10/1998 |
| JP | H08121603 A | 5/1996 |
| JP | 2002276815 A | 9/2002 |
| JP | 2008275052 A | 11/2008 |
| JP | 2013-142425 A | 7/2013 |
| JP | 5418735 B1 | 2/2014 |
| WO | 2011105513 A1 | 9/2011 |
| WO | 2015/111707 A1 | 7/2015 |

OTHER PUBLICATIONS

Korean Office Action dated Jun. 19, 2018 with English translation (corresponding to KR 10-2017-7024618).
Extended European Search Report dated Sep. 21, 2018 (corresponding to EP 16764836.9).

* cited by examiner

SEAL RING

CROSS-REFERENCE TO RELATED APPLICATIONS

This application is a National Stage of International Application No. PCT/JP2016/057546, filed Mar. 10, 2016, which claims priority to Japanese Application No. 2015-052653, filed Mar. 16, 2015; Japanese Application No. 2015-052675, filed Mar. 16, 2015; and Japanese Application No. 2015-052691, filed Mar. 16, 2015. The entire disclosures of each of the above applications are incorporated herein by reference.

FIELD

The present disclosure relates to a seal ring that seals the annular gap between a shaft and the shaft hole of a housing.

BACKGROUND

An Automatic Transmission (AT), a Continuously Variable Transmission (CVT), or the like for an automobile is provided with a seal ring that seals the annular gap between a shaft and a housing rotating relative to each other to maintain hydraulic pressure. In recent years, an increase in fuel efficiency has been propelled as countermeasures for environmental issues, and there has been an increased demand for reducing a rotational torque in the above seal ring. In view of this, there has been known technology for providing a groove that guides sealed fluid to the side of the sliding surface of a seal ring to generate dynamic pressure (see PTL 1). In such technology, however, when sealed fluid contains foreign matter, there is a possibility that the effect of reducing a rotational torque is not sufficiently exhibited with a reduction in dynamic pressure effect and that sealing performance reduces with the acceleration of wear-out as a result of the foreign matter being put in the groove.

Note that there has been also known technology for providing a groove, through which the side of an inner peripheral surface and the side of an outer peripheral surface communicate with each other, on the side of the sliding surface of a seal ring to remove foreign matter from the sliding surface of the seal ring (see PTL 2). In such technology, however, sealed fluid leaks from a groove. Therefore, there is a possibility that a leakage amount increases.

Here, an analysis result has shown that a main factor why foreign matter is put in a groove that guides dynamic pressure as described above lies in the intrusion of the foreign matter from an abutment joint part provided in a seal ring. This point will be described with reference to FIG. 43. FIG. 43 is a partially enlarged view of the side view of a seal ring according to a conventional example. In general, a resinous seal ring 500 has an abutment joint part 510 at one portion in its circumferential direction to be easily attached to an annular groove provided on a shaft. Since a gap is formed in the abutment joint part 510, it seems that foreign matter intrudes from the gap into the sliding part between the seal ring 500 and the lateral wall surface of the annular groove and intrudes into grooves 520 that generate dynamic pressure as indicated by an arrow in the figure.

CITATION LIST

Patent Literature

[PTL 1] Japanese Patent Application Laid-open No. H08-121603

[PTL 2] Japanese Patent Application Laid-open No. 2002-276815

SUMMARY

Technical Problem

It is an object of the present disclosure to provide a seal ring capable of stably reducing a rotational torque while preventing the leakage of sealed fluid.

Solution to Problem

The present disclosure employs the following solution to solve the above problem.

That is, the present disclosure provides a seal ring that is attached to an annular groove provided on an outer periphery of a shaft and seals an annular gap between the shaft and a housing that rotate relative to each other, to maintain fluid pressure in a sealed region in which the fluid pressure is configured to change, the seal ring sliding on a lateral wall surface of the annular groove on a lower pressure side, the seal ring including: an abutment joint part provided at one portion in a circumferential direction thereof; a plurality of dynamic pressure generation grooves provided at intervals in the circumferential direction on a side of a sliding surface thereof sliding on the lateral wall surface; and foreign matter discharging grooves that are provided between a region in which the plurality of dynamic pressure generation grooves is arranged and the abutment joint part in the circumferential direction on the side of the sliding surface sliding on the lateral wall surface, and that are capable of catching foreign matter intruding from the abutment joint part and discharging the caught foreign matter to an outside of a sliding part between the seal ring and the lateral wall surface.

According to the present disclosure, the foreign matter discharging grooves are provided between the region in which the plurality of dynamic pressure generation grooves is arranged and the abutment joint part in the circumferential direction. Accordingly, foreign matter is caught by the foreign matter discharging grooves and discharged to the outside of the sliding part even if the foreign matter intrudes from the abutment joint part. Therefore, the intrusion of foreign matter into the dynamic pressure generation grooves can be prevented. Thus, the impairment of the dynamic pressure generation function of the dynamic pressure generation grooves due to foreign matter can be prevented, and the acceleration of wear-out due to foreign matter can be prevented.

The foreign matter discharging grooves may each have a groove depth greater than the groove depth of the dynamic pressure generation grooves.

The foreign matter discharging grooves may be provided on both sides of the abutment joint part in the circumferential direction.

Thus, foreign matter is caught by the foreign matter discharging grooves and discharged to the outside of the sliding part regardless of the rotating direction of the seal ring relative to the annular groove.

The foreign matter discharging grooves may extend from an inner peripheral surface of the seal ring toward an outside in a radial direction up to a position not reaching an outer peripheral surface of the seal ring.

Thus, the leakage of sealed fluid from the foreign matter discharging grooves can be prevented.

The foreign matter discharging grooves may be provided at a position that falls within a sliding region in which the seal ring slides on the lateral wall surface.

Thus, the leakage of sealed fluid from the foreign matter discharging grooves can be more reliably prevented.

The foreign matter discharging grooves may extend from an outer peripheral surface of the seal ring toward an inside in a radial direction up to a position not reaching an inner peripheral surface of the seal ring.

Thus, foreign matter caught by the foreign matter discharging grooves due to the differential pressure between a sealed region and its opposite region (non-sealed region) can be actively discharged to the non-sealed region. In addition, since the foreign matter discharging grooves extend from the outer peripheral surface of the seal ring toward the inside in the radial direction up to the position not reaching the inner peripheral surface of the seal ring, the intrusion amount of sealed fluid into the foreign matter discharging grooves can be suppressed.

A range in which the dynamic pressure generation grooves are provided falls within a range in which the foreign matter discharging grooves are provided when seen in the circumferential direction.

Thus, the intrusion of foreign matter into the dynamic pressure generation grooves without passing through the foreign matter discharging grooves can be prevented.

The foreign matter discharging grooves may have a foreign matter introduction groove that guides the foreign matter thereinto on a side thereof on which the abutment joint part is provided in the circumferential direction.

Thus, foreign matter is stably guided into the foreign matter discharging grooves.

The foreign matter discharging grooves may have an auxiliary dynamic pressure generation groove that generates dynamic pressure on a side thereof opposite to the side on which the abutment joint part is provided in the circumferential direction.

Thus, the auxiliary dynamic pressure generation groove can also generate dynamic pressure.

In addition, the present disclosure provides a seal ring that is attached to an annular groove provided on an outer periphery of a shaft and seals an annular gap between the shaft and a housing that rotate relative to each other, to maintain fluid pressure in a sealed region in which the fluid pressure is configured to change, the seal ring sliding on a lateral wall surface of the annular groove on a lower pressure side, the seal ring including: an abutment joint part provided at one portion in a circumferential direction thereof; a plurality of dynamic pressure generation grooves provided at intervals in the circumferential direction on a side of a sliding surface thereof sliding on the lateral wall surface; and foreign matter discharging holes that are provided between a region in which the plurality of dynamic pressure generation grooves is arranged and the abutment joint part in the circumferential direction on the side of the sliding surface sliding on the lateral wall surface, and that are capable of catching foreign matter intruding from the abutment joint part and discharging the caught foreign matter to a side of an inner peripheral surface of the seal ring.

According to the present disclosure, the foreign matter discharging holes are provided between the region in which the plurality of dynamic pressure generation grooves is arranged and the abutment joint part in the circumferential direction. Accordingly, foreign matter is caught by the foreign matter discharging grooves and discharged to the side of the inner peripheral surface of the seal ring even if the foreign matter intrudes from the abutment joint part.

Therefore, the intrusion of foreign matter into the dynamic pressure generation grooves can be prevented. Thus, the impairment of the dynamic pressure generation function of the dynamic pressure generation grooves due to foreign matter can be prevented, and the acceleration of wear-out due to foreign matter can be prevented.

The foreign matter discharging holes may each have a groove depth greater than the groove depth of the dynamic pressure generation grooves.

The foreign matter discharging holes may be provided on both sides of the abutment joint part in the circumferential direction.

Thus, foreign matter is caught by the foreign matter discharging holes and discharged to the side of the inner peripheral surface of the seal ring regardless of the rotating direction of the seal ring relative to the annular groove.

The foreign matter discharging holes may be provided at a position that falls within a sliding region in which the seal ring slides on the lateral wall surface.

Thus, the leakage of sealed fluid from the foreign matter discharging grooves can be more reliably prevented.

The foreign matter discharging holes may be configured such that an inclined surface on a side closer to an outer peripheral surface relative to a deepest position has greater inclination than inclination of an inclined surface on the side of the inner peripheral surface, and that an inclined surface on a side opposite to the abutment joint part relative to the deepest position has greater inclination than inclination of an inclined surface on a side of the abutment joint part.

Thus, since sealed fluid intruding from the side of the abutment joint part into the foreign matter discharging holes flows toward the side of the inner peripheral surface, foreign matter caught by the foreign matter discharging holes is discharged to the side of the inner peripheral surface of the seal ring.

Moreover, the present disclosure provides a seal ring that is attached to an annular groove provided on an outer periphery of a shaft and seals an annular gap between the shaft and a housing that rotate relative to each other, to maintain fluid pressure in a sealed region in which the fluid pressure is configured to change, the seal ring sliding on a lateral wall surface of the annular groove on a lower pressure side, the seal ring including: an abutment joint part provided at one portion in a circumferential direction thereof; a plurality of dynamic pressure generation grooves provided at intervals in the circumferential direction on a side of a sliding surface thereof sliding on the lateral wall surface; and foreign matter discharging grooves provided on the side of the sliding surface sliding on the lateral wall surface and ranging from an inner peripheral surface to end surfaces of the abutment joint part.

According to the present disclosure, the seal ring has the foreign matter discharging grooves, which range from the inner peripheral surface to the end surfaces of the abutment joint part, on the side of the sliding surface sliding on the lateral wall surface of the annular groove. Accordingly, foreign matter is discharged to the side of the inner peripheral surface of the seal ring by the foreign matter discharging grooves even if the foreign matter intrudes into the gap of the abutment joint part. Therefore, the intrusion of foreign matter into the dynamic pressure generation grooves can be prevented. Thus, the impairment of the dynamic pressure generation function of the dynamic pressure generation grooves due to foreign matter can be prevented, and the acceleration of wear-out due to foreign matter can be prevented.

The foreign matter discharging grooves may each have a groove depth greater than the groove depth of the dynamic pressure generation grooves.

The foreign matter discharging grooves may be provided on both sides of the abutment joint part in the circumferential direction.

Thus, foreign matter is discharged to the side of the inner peripheral surface of the seal ring by the foreign matter discharging grooves regardless of the rotating direction of the seal ring relative to the annular groove.

Advantageous Effects of the Disclosure

As described above, the present disclosure can stably reduce a rotational torque while preventing the leakage of sealed fluid.

DRAWINGS

DETAILED DESCRIPTION

Hereinafter, with reference to the drawings, configurations for carrying out the present disclosure will be illustratively described in detail based on embodiments and examples. However, dimensions, materials, shapes, their relative arrangements, or the like of constituents described in the embodiments and the examples do not intend to limit the scope of the present disclosure unless otherwise specifically described. Note that seal rings according to the present embodiments and the examples are used to seal the annular gap between a shaft and a housing that rotate relative to each other to maintain hydraulic pressure in a transmission such as an AV or a CVT for an automobile. In addition, in the following description, a "higher pressure side" indicates a side where pressure becomes higher when differential pressure is generated between both sides of the seal rings, whereas a "lower pressure side" indicates a side where pressure becomes lower when differential pressure is generated between both sides of the seal rings.

First Embodiment

Figure 1:
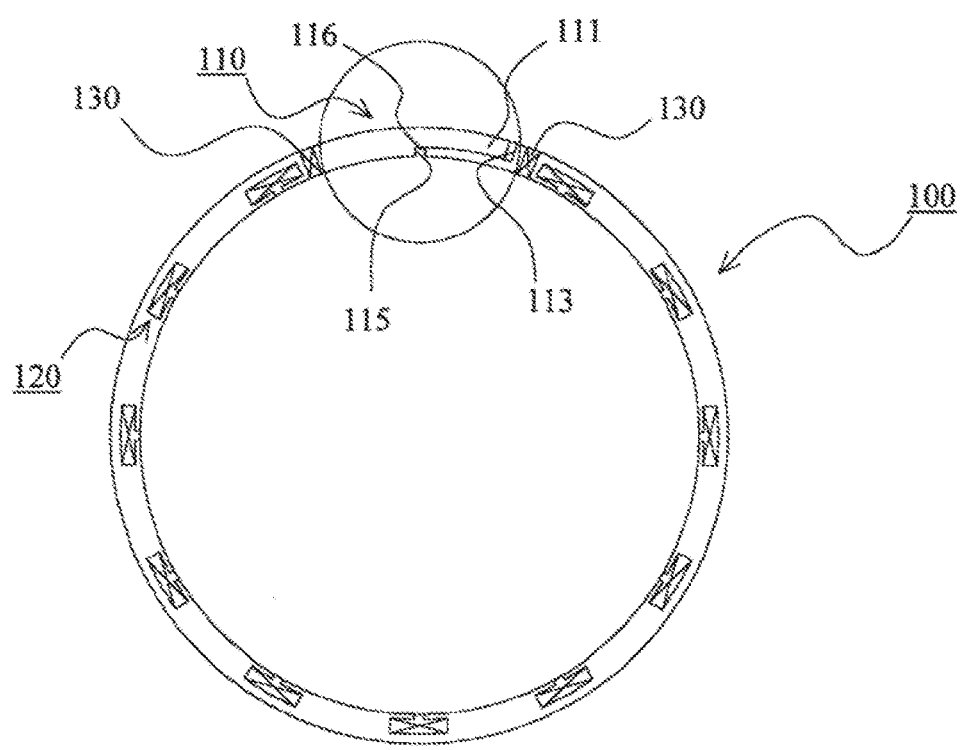
FIG. 1 is a side view of a seal ring according to a first embodiment of the present disclosure.
Figure 2:
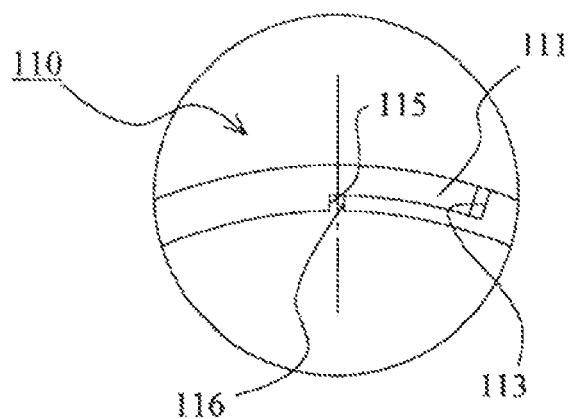
FIG. 2 is a partially enlarged view of the side view of the seal ring according to the first embodiment of the present disclosure.
Figure 3:
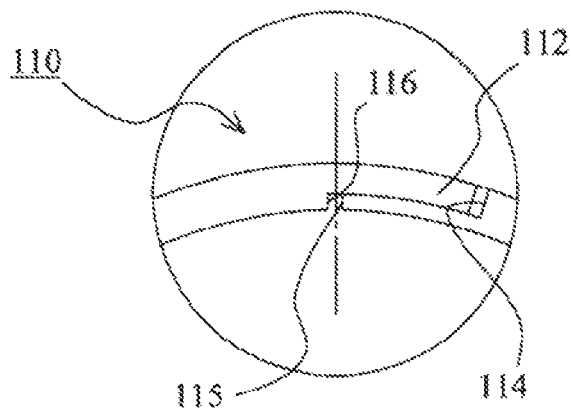
FIG. 3 is a partially enlarged view of the side view of the seal ring according to the first embodiment of the present disclosure.
Figure 4:
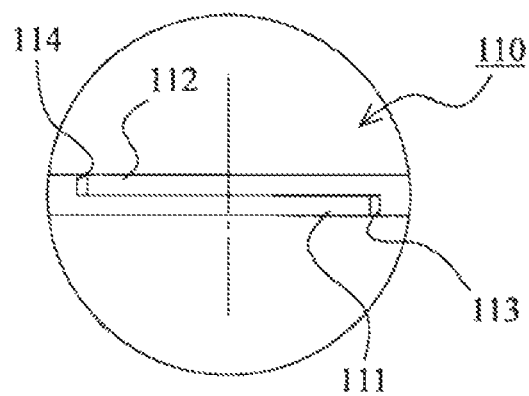
FIG. 4 is a partially enlarged view of the seal ring according to the first embodiment of the present disclosure when seen from the side of its outer peripheral surface.
Figure 5:
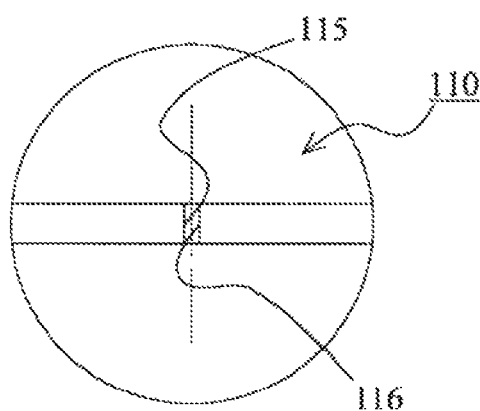
FIG. 5 is a partially enlarged view of the seal ring according to the first embodiment of the present disclosure when seen from the side of its inner peripheral surface.
Figure 6:
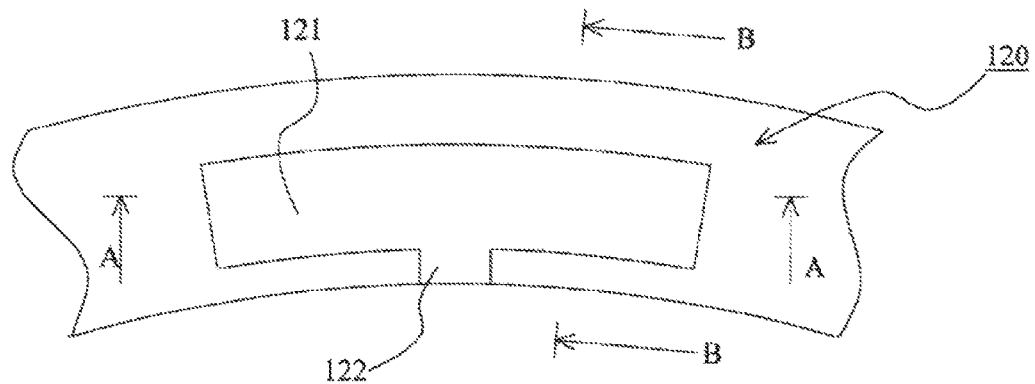
FIG. 6 is a partially enlarged view of the side view of the seal ring according to the first embodiment of the present disclosure.
Figure 7:
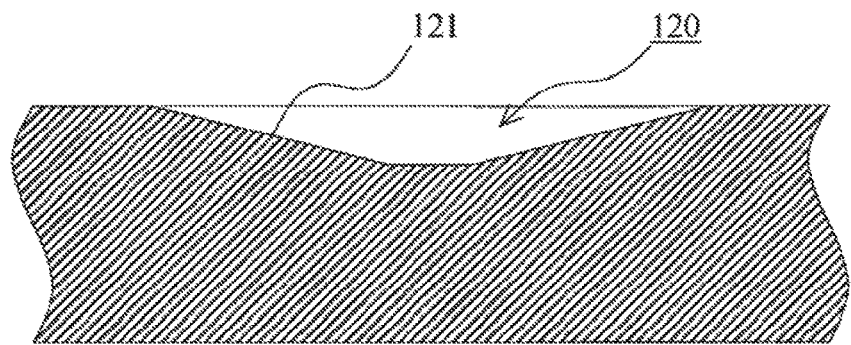
FIG. 7 is a schematic cross-sectional view of the seal ring according to the first embodiment of the present disclosure.
Figure 8:
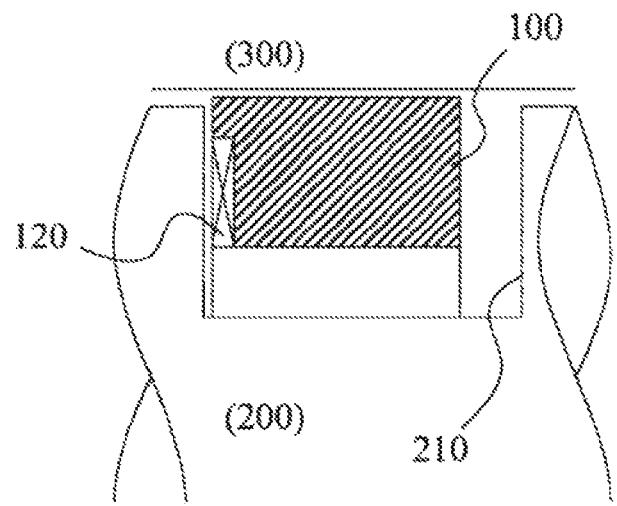
FIG. 8 is a schematic cross-sectional view showing a state in which the seal ring according to the first embodiment of the present disclosure is in use.
Figure 9:
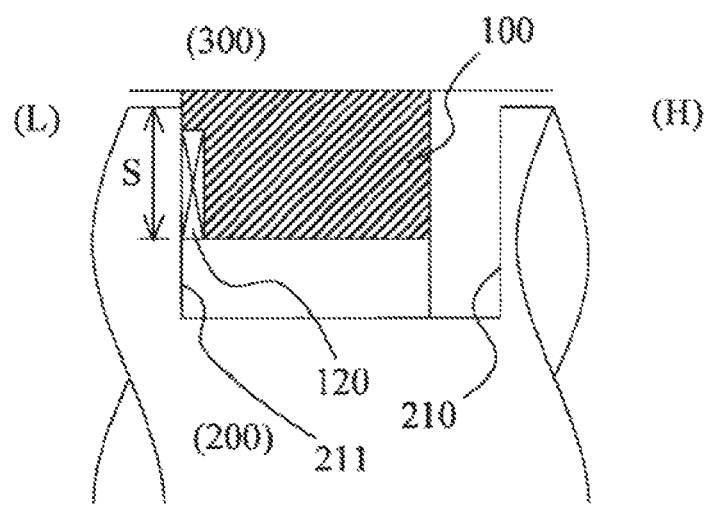
FIG. 9 is a schematic cross-sectional view showing a state in which the seal ring according to the first embodiment of the present disclosure is in use.

A seal ring according to a first embodiment of the present disclosure will be described with reference to FIGS. 1 to 9. FIG. 1 is a side view of the seal ring according to the first embodiment of the present disclosure. FIG. 2 is a partially enlarged view of the side view of the seal ring according to the first embodiment of the present disclosure in which a part surrounded by a circle in FIG. 1 is enlarged. FIG. 3 is a partially enlarged view of the side view of the seal ring according to the first embodiment of the present disclosure in which the part surrounded by the circle in FIG. 1 is seen from the opposite side of the seal ring. FIG. 4 is a partially enlarged view of the seal ring according to the first embodiment of the present disclosure when seen from the side of its outer peripheral surface in which the part surrounded by the circle in FIG. 1 is seen from the side of the outer peripheral surface. FIG. 5 is a partially enlarged view of the seal ring according to the first embodiment of the present disclosure when seen from the side of its inner peripheral surface in which the part surrounded by the circle in FIG. 1 is seen from the side of the inner peripheral surface. FIG. 6 is a partially enlarged view of the side view of the seal ring according to the first embodiment of the present disclosure in which the vicinity of a dynamic pressure generation groove is shown. FIG. 7 is a schematic cross-sectional view of the seal ring according to the first embodiment of the present disclosure in which an A-A cross section in FIG. 6 is shown. FIGS. 8 and 9 are schematic cross-sectional views showing a state in which the seal ring according to the first embodiment of the present disclosure is in use. Note that FIG. 8 shows a state in which no load is generated and FIG. 9 shows a state in which differential pressure is generated. In addition, the seal ring in FIGS. 8 and 9 corresponds to a B-B cross section in FIG. 6.

<Configuration of Seal Ring>

A seal ring 100 according to the present embodiment is attached to an annular groove 210 provided on the outer periphery of a shaft 200 and seals the annular gap between the shaft 200 and a housing 300 (the inner peripheral surface of a shaft hole in which the shaft 200 is to be inserted in the housing 300) that rotate relative to each other. Thus, the seal ring 100 maintains fluid pressure in a sealed region in which the fluid pressure (hydraulic pressure in the present embodiment) is configured to change. Here, in the present embodiment, fluid pressure in a region on the right side of the seal ring 100 in FIGS. 8 and 9 is configured to change. Further, the seal ring 100 plays a role in maintaining the fluid pressure in the sealed region on the right side in the figure via the seal ring 100. Note that the fluid pressure in the sealed region is low and no load is generated when the engine of an automobile is stopped, whereas the fluid pressure in the sealed region becomes high when the engine is started. In addition, FIG. 9 shows a state in which the fluid pressure on the right side in the figure becomes higher than the fluid pressure on the left side in the figure. Hereinafter, the right side and the left side in FIG. 9 will be called a higher pressure side (H) and a lower pressure side (L), respectively.

Further, the seal ring 100 is made of a resin material such as polyether ether ketone (PEEK), polyphenylenesulfide (PPS), and polytetrafluoroethylene (PTFE). In addition, the outer peripheral surface of the seal ring 100 is configured to have a peripheral length shorter than that of the inner peripheral surface of the shaft hole of the housing 300 and configured not to have interference. Accordingly, in a state in which the fluid pressure does not act, the outer peripheral surface of the seal ring 100 could be separated from the inner peripheral surface of the shaft hole of the housing 300 (see FIG. 8).

The seal ring 100 has an abutment joint part 110 at one portion in its circumferential direction. In addition, the seal ring 100 has groove parts 120 having a dynamic pressure generation groove 121 and foreign matter discharging grooves 130 on the side of its sliding surface. Note that the seal ring 100 according to the present embodiment is configured to form the above abutment joint part 110, the plurality of groove parts 120, and the plurality of foreign matter discharging grooves 130 in its annular member having a rectangle cross section. However, the configuration merely describes the shape of the seal ring 100 and does not necessarily imply that the abutment joint part 110, the plurality of groove parts 120, and the plurality of foreign matter discharging grooves 130 are formed using an annular member having a rectangle cross section as a material. Of course, these parts can be obtained by cutting after an annular member having a rectangle cross section is molded. However, for example, the plurality of groove parts 120 and the plurality of foreign matter discharging grooves 130 may be obtained by cutting after one having the abutment joint part 110 is molded in advance, and its manufacturing method is not particularly limited.

The configuration of the abutment joint part 110 according to the present embodiment will be described with particular reference to FIGS. 2 to 5. The abutment joint part 110 according to the present embodiment employs a special step cut with which the abutment joint part 110 is cut off in a staircase pattern when seen from any of the side of the outer peripheral surface and the sides of both lateral wall surfaces. Thus, in the seal ring 100, a first fitting convex part 111 and a first fitting concave part 114 are provided on the side of the outer peripheral surface on one side via a cutting part, whereas a second fitting concave part 113 in which the first fitting convex part 111 is to be fitted and a second fitting convex part 112 that is to be fitted in the first fitting concave part 114 are provided on the side of the outer peripheral surface on the other side via the cutting part. Note that an end surface 115 on the side of the inner peripheral surface on the one side and an end surface 116 on the side of the inner periphery on the other side face each other via the cutting part. The special step cut is known technology, and thus its detailed description will be omitted. However, the special step cut has the property of maintaining stable sealing performance even if the circumferential length of the seal ring 100 changes due to its thermal expansion/contraction. Note that the "cutting part" includes not only a cutting part cut off by cutting but also a cutting part obtained by molding.

The groove parts 120 are provided in plurality at even intervals over a circumference of a lateral surface of the seal ring 100 on the side of the sliding surface, excluding the vicinity of the abutment joint part 110 (see FIG. 1). The plurality of groove parts 120 is provided to generate dynamic pressure when the seal ring 100 slides on a lateral wall surface 211 on a lower pressure side (L) of the annular groove 210 provided on the shaft 200.

Further, the groove parts 120 have the dynamic pressure generation groove 121 extending in the circumferential direction and an introduction groove 122 extending from a central position in the circumferential direction of the dynamic pressure generation groove 121 to the inner peripheral surface and guiding sealed fluid into the dynamic pressure generation groove 121 (see FIG. 6). In addition, the dynamic pressure generation groove 121 is configured to have a groove bottom made shallower at its end in the circumferential direction than at its central part in the circumferential direction. In the present embodiment, the groove bottom of the dynamic pressure generation groove 121 is configured by a planar inclined surface (see FIG. 7). However, the dynamic pressure generation groove 121 is not limited to the example shown in the figures, but various known technologies can be employed so long as the dynamic pressure generation groove 121 has the function of generating dynamic pressure when sealed fluid is discharged from the inside of the groove to a sliding part. Moreover, the groove parts 120 are provided at a position that falls within a sliding region S in which the seal ring 100 slides on the lateral wall surface 211 on the lower pressure side (L) (see FIG. 9). Accordingly, the leakage of sealed fluid from the groove part 120 to the lower pressure side (L) is prevented.

In addition, the foreign matter discharging grooves 130 are provided on the lateral surface on the side of the sliding surface of the seal ring 100 as described above. The foreign matter discharging grooves 130 are provided between a region in which the plurality of dynamic pressure generation grooves 121 (the groove parts 120 having the dynamic pressure generation groove 121) is arranged and the abutment joint part 110 in the circumferential direction. Further, the foreign matter discharging grooves 130 are provided to catch foreign matter intruding from the abutment joint part 110 and discharge the caught foreign matter to the outside of the sliding part between the seal ring 100 and the lateral wall surface 211. In addition, the foreign matter discharging grooves 130 are each configured to have a groove depth greater than that of the dynamic pressure generation grooves 121. Moreover, in the present embodiment, the foreign matter discharging grooves 130 are provided on both sides of the abutment joint part 110 in the circumferential direction.

<Mechanism where Seal Ring is in Use>

A mechanism where the seal ring 100 according to the present embodiment is in use will be described with particular reference to FIGS. 8 and 9. In a no load state in which an engine is stopped, there is no differential pressure between the right and left regions and thus the seal ring 100 could be separated from the lateral wall surface on the left side in the figure of the annular groove 210 and the inner peripheral surface of the shaft hole of the housing 300 as shown in FIG. 8.

FIG. 9 shows a state in which differential pressure is generated (the pressure on the right side becomes higher than the pressure on the left side in the figure) via the seal ring 100 with the start of the engine. When differential pressure is generated with the start of the engine, the seal ring 100 is brought into intimate contact with the lateral wall surface 211 on the lower pressure side (L) of the annular groove 210 and the inner peripheral surface of the shaft hole of the housing 300.

Thus, it becomes possible to seal the annular gap between the shaft 200 and the housing 300 that rotate relative to each other to maintain fluid pressure in the sealed region (the region on the higher pressure side (H)) in which the fluid pressure is configured to change. Further, when the shaft 200 and the housing 300 rotate relative to each other, the seal ring 100 slides on the lateral wall surface 211 on the lower pressure side (L) of the annular groove 210. Further, dynamic pressure is generated when sealed fluid flows out to the sliding part from the dynamic pressure generation grooves 121 of the groove parts 120 provided on the lateral surface on the side of the sliding surface of the seal ring 100. Note that when the seal ring 100 rotates in a clockwise direction in FIG. 1 relative to the annular groove 210, the sealed fluid flows out to the sliding part from the ends in the counterclockwise direction of the dynamic pressure generation grooves 121. Further, when the seal ring 100 rotates in the counterclockwise direction in FIG. 1 relative to the annular groove 210, the sealed fluid flows out to the sliding part from the ends in the clockwise direction of the dynamic pressure generation grooves 121.

In addition, in the abutment joint part 110, a gap is formed between the end surface 115 on the side of the inner peripheral surface on the one side and the end surface 116 on the side of the inner periphery on the other side via the cutting part. Accordingly, there is a likelihood that foreign matter intrudes from the gap. However, in the present embodiment, foreign matter intruding from the abutment joint part 110 is caught by the foreign matter discharging grooves 130 and discharged to the outside of the sliding part between the seal ring 100 and the lateral wall surface 211 as described above.

<Excellent Point of Seal Ring According to Present Embodiment>

In the seal ring 100 according to the present embodiment, foreign matter is caught by the foreign matter discharging grooves 130 and discharged to the outside of the sliding part even if the foreign matter intrudes from the abutment joint part 110 as described above. Therefore, the intrusion of foreign matter into the dynamic pressure generation grooves 121 can be prevented. Thus, the impairment of the dynamic pressure generation function of the dynamic pressure generation grooves 121 due to foreign matter can be prevented, and the acceleration of wear-out due to foreign matter can be prevented.

In addition, in the present embodiment, the foreign matter discharging grooves 130 are provided on both sides of the abutment joint part 110 in the circumferential direction. Thus, foreign matter is caught by the foreign matter discharging grooves 130 and discharged to the outside of the sliding part regardless of the rotating direction of the seal ring 100 relative to the annular groove 210.

Hereinafter, more specific present examples (first to ninth examples) of the foreign matter discharging grooves will be described.

First Example

Figure 10:
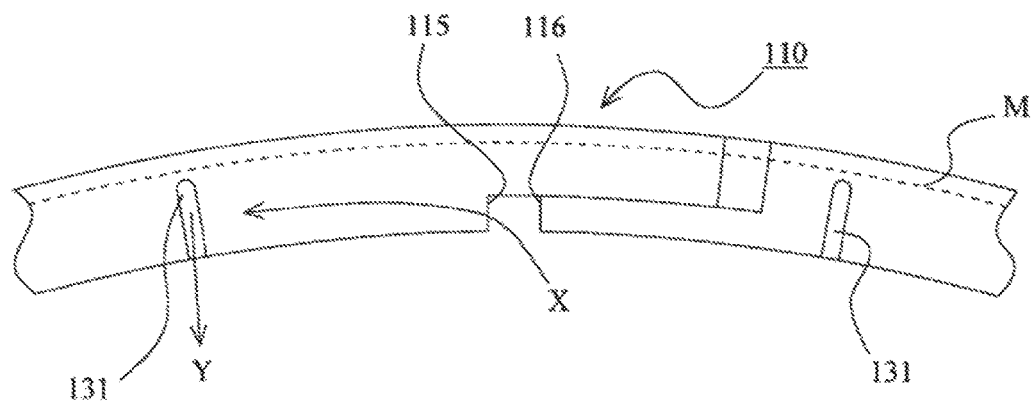
FIG. 10 is a partially enlarged view of the side view of a seal ring according to a first example of the present disclosure.

A foreign matter discharging groove according to a first example will be described with reference to FIG. 10. FIG. 10 is a partially enlarged view of the side view of a seal ring according to the first example of the present disclosure in which the vicinity of an abutment joint part and foreign matter discharging grooves is enlarged.

As described in the above embodiment, foreign matter discharging grooves 131 are provided on both sides of an abutment joint part 110 in the circumferential direction on the lateral surface on the side of the sliding surface of a seal ring 100. The foreign matter discharging grooves 131 according to the present example are configured to linearly extend from the inner peripheral surface of the seal ring 100 toward an outside in the radial direction up to a position not reaching the outer peripheral surface of the seal ring 100. Thus, even if foreign matter intrudes from the place between an end surface 115 and an end surface 116 of the abutment joint part 110 in an arrow X direction when the seal ring 100 rotates in a clockwise direction in FIG. 10 relative to an annular groove 210, the foreign matter is caught by the foreign matter discharging groove 131. Further, the caught foreign matter flows from the foreign matter discharging groove 131 in an arrow Y direction and discharged to the outside of a sliding part.

In addition, since the foreign matter discharging grooves 131 according to the present example do not communicate with the outer peripheral surface of the seal ring 100, the leakage of sealed fluid from the foreign matter discharging grooves 131 can be prevented. Moreover, the foreign matter discharging grooves 131 according to the present example are provided at a position that falls within a sliding region S (see FIG. 9) in which the seal ring 100 slides on a lateral wall surface 211 on the lower pressure side (L) of an annular groove 210. Thus, the leakage of sealed fluid from the foreign matter discharging grooves 131 can be more reliably prevented. Note that in FIG. 10, the inside in the radial direction of dashed lines M corresponds to the sliding region S in which the seal ring 100 slides on the lateral wall surface 211.

In addition, the present example is configured such that a range in which the dynamic pressure generation grooves 121 are provided falls within a range in which the foreign matter discharging grooves 131 are provided when seen in the circumferential direction. That is, when it is assumed that a distance from the center of the circle of the seal ring 100 having a toric plane shape to the tip on the outside in the radial direction of the foreign matter discharging grooves 131 is expressed as R1 and a distance from the center of the above circle to the lateral surface on the outside in the radial direction of the dynamic pressure generation grooves 121 is expressed as R2, the relationship R1≥R2 is satisfied. Thus, the intrusion of foreign matter into the dynamic pressure generation grooves 121 without passing through the foreign matter discharging grooves 131 can be prevented.

Second Example

Figure 11:
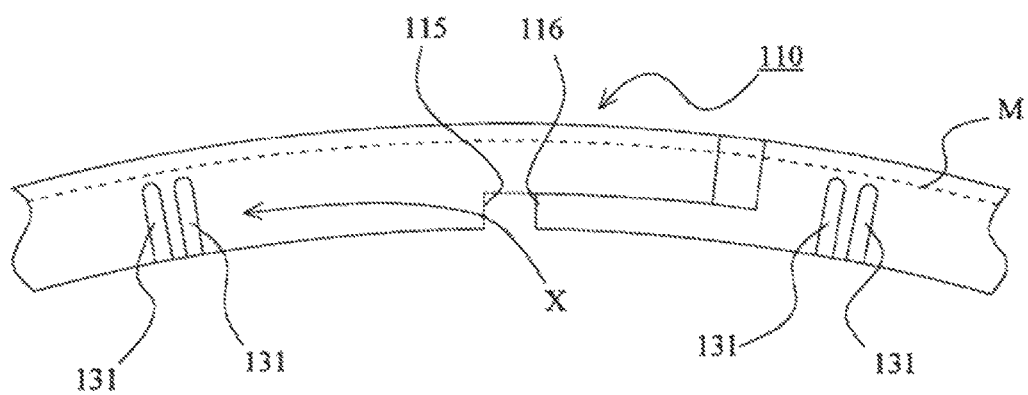
FIG. 11 is a partially enlarged view of the side view of a seal ring according to a second example of the present disclosure.

FIG. 11 shows a second example of the present disclosure. FIG. 11 is a partially enlarged view of the side view of a seal ring according to the second example of the present disclosure in which the vicinity of an abutment joint part and foreign matter discharging grooves is enlarged. Note that since basic configurations and operations are the same as those of the first example, the same constituents will be denoted by the same symbols and their descriptions will be omitted appropriately.

In a seal ring 100 according to the present example, two foreign matter discharging grooves 131 described in the above first example are provided side by side on both sides of an abutment joint part 110 in the circumferential direction. In the present example, since foreign matter can be caught by a second one of the foreign matter discharging grooves 131 even if the foreign matter cannot be caught by a first one of the foreign matter discharging grooves 131, the flowing of the foreign matter into dynamic pressure generation grooves 121 can be more prevented.

By the arrangement of the plurality of foreign matter discharging grooves 131 side by side as described above, foreign matter can be more reliably caught and discharged to the outside of a sliding part. Note that three or more foreign matter discharging grooves 131 may be provided side by side.

Third Example

Figure 12:
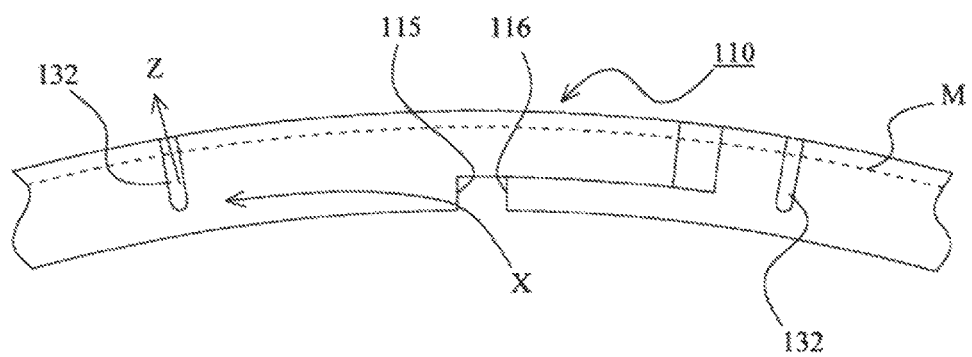
FIG. 12 is a partially enlarged view of the side view of a seal ring according to a third example of the present disclosure.

FIG. 12 shows a third example of the present disclosure. FIG. 12 is a partially enlarged view of the side view of a seal ring according to the third example of the present disclosure in which the vicinity of an abutment joint part and foreign matter discharging grooves is enlarged. Note that since basic configurations and operations are the same as those of the first example, the same constituents will be denoted by the same symbols and their descriptions will be omitted appropriately.

In the present example as well, foreign matter discharging grooves 132 are provided on both sides of an abutment joint part 110 in the circumferential direction on the lateral surface on the side of the sliding surface of a seal ring 100. The foreign matter discharging grooves 132 according to the present example are configured to linearly extend from the outer peripheral surface of the seal ring 100 toward an inside in the radial direction up to a position not reaching the inner peripheral surface of the seal ring 100. Thus, even if foreign matter intrudes from the place between an end surface 115 and an end surface 116 of the abutment joint part 110 in an arrow X direction when the seal ring 100 rotates in a clockwise direction in FIG. 12 relative to an annular groove 210, the foreign matter is caught by the foreign matter discharging groove 132. Further, the caught foreign matter flows from the foreign matter discharging groove 132 in an arrow Z direction and discharged to the outside of a sliding part. In addition, in the present example, foreign matter caught by the foreign matter discharging grooves 132 due the differential pressure between a sealed region (a region on a higher pressure side (H)) and its opposite region (a region on a lower pressure side (L)) can be actively discharged to the region on the lower pressure side (L). Moreover, since the foreign matter discharging grooves 132 according to the present example do not communicate with the inner peripheral surface of the seal ring 100, the leakage of sealed fluid from the foreign matter discharging grooves 132 can be prevented.

In addition, the present example is configured such that a range in which dynamic pressure generation grooves 121 are provided falls within a range in which the foreign matter discharging grooves 132 are provided when seen in the circumferential direction. That is, when it is assumed that a distance from the center of the circle of the seal ring 100 having a toric plane shape to the tip on the inside in the radial direction of the foreign matter discharging grooves 132 is expressed as R3 and a distance from the center of the above circle to the lateral surface on the inside in the radial direction of the dynamic pressure generation grooves 121 is expressed as R4, the relationship R4≥R3 is satisfied. Thus, the intrusion of foreign matter into the dynamic pressure generation grooves 121 without passing through the foreign matter discharging grooves 132 can be prevented.

Fourth Example

Figure 13:
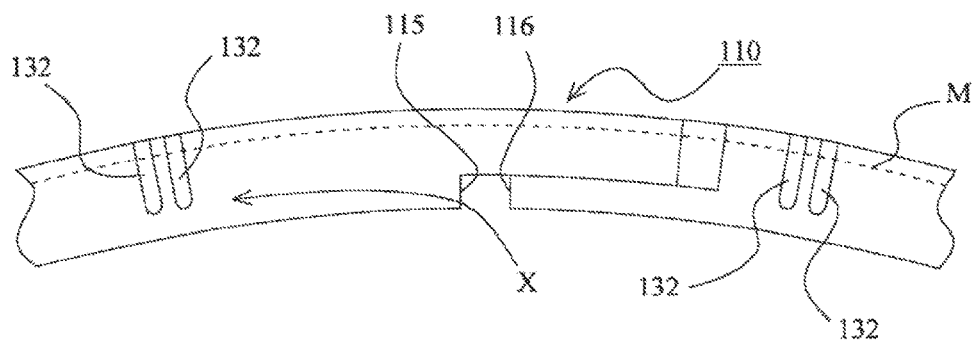
FIG. 13 is a partially enlarged view of the side view of a seal ring according to a fourth example of the present disclosure.

FIG. 13 shows a fourth example of the present disclosure. FIG. 13 is a partially enlarged view of the side view of a seal ring according to the fourth example of the present disclosure in which the vicinity of an abutment joint part and foreign matter discharging grooves is enlarged. Note that since basic configurations and operations are the same as those of the first example, the same constituents will be denoted by the same symbols and their descriptions will be omitted appropriately.

In a seal ring 100 according to the present example, two foreign matter discharging grooves 132 described in the above third example are provided side by side on both sides of an abutment joint part 110 in the circumferential direction. In the present example, since foreign matter can be caught by a second one of the foreign matter discharging grooves 132 even if the foreign matter cannot be caught by a first one of the foreign matter discharging grooves 132, the flowing of the foreign matter into dynamic pressure generation grooves 121 can be more prevented.

By the arrangement of the plurality of foreign matter discharging grooves 132 side by side as described above, foreign matter can be more reliably caught and discharged to the outside of a sliding part. Note that three or more foreign matter discharging grooves 132 may be provided side by side.

Fifth Example

Figure 14:
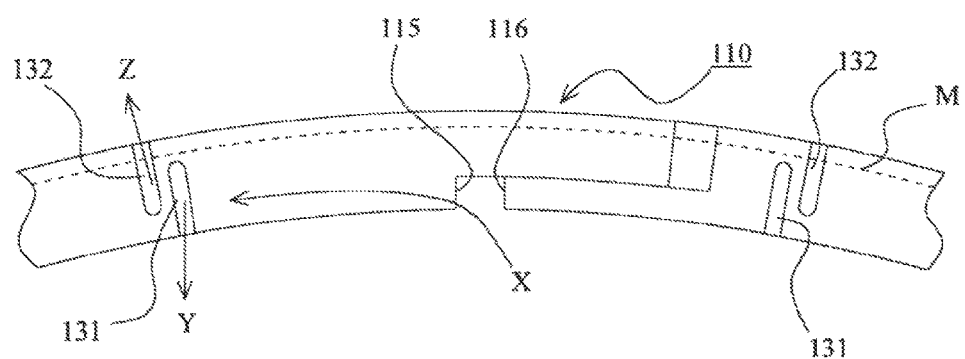
FIG. 14 is a partially enlarged view of the side view of a seal ring according to a fifth example of the present disclosure.

FIG. 14 shows a fifth example of the present disclosure. FIG. 14 is a partially enlarged view of the side view of a seal ring according to the fifth example of the present disclosure in which the vicinity of an abutment joint part and foreign matter discharging grooves is enlarged. Note that since basic configurations and operations are the same as those of the first example, the same constituents will be denoted by the same symbols and their descriptions will be omitted appropriately.

In a seal ring 100 according to the present example, a pair of a foreign matter discharging groove 131 described in the above first example and a foreign matter discharging groove 132 described in the above third example is provided side by side on both sides of an abutment joint part 110 in the circumferential direction. In the present example, since foreign matter can be caught by the second foreign matter discharging grooves 132 even if the foreign matter cannot be caught by the first foreign matter discharging grooves 131, the flowing of the foreign matter into dynamic pressure generation grooves 121 can be more prevented.

Sixth Example

Figure 15:
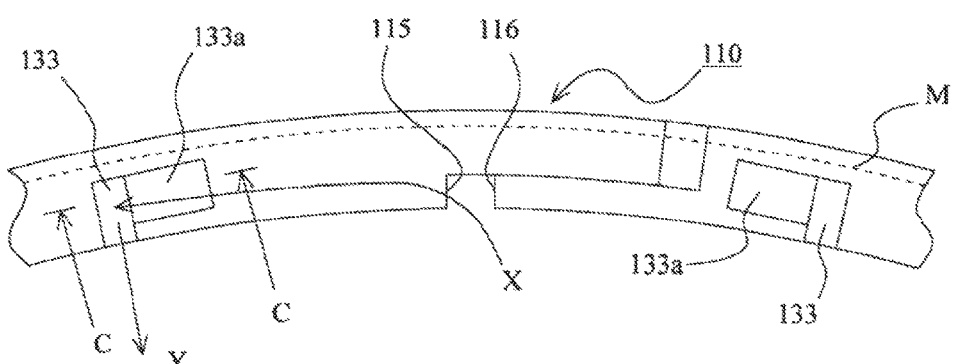
FIG. 15 is a partially enlarged view of the side view of a seal ring according to a sixth example of the present disclosure.
Figure 16:
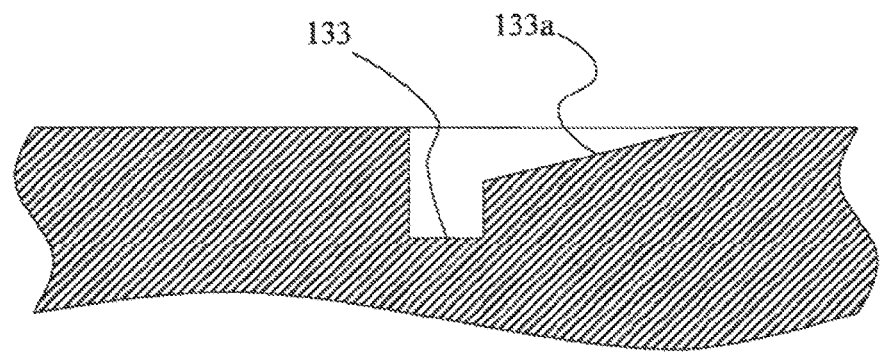
FIG. 16 is a schematic cross-sectional view of the seal ring according to the sixth example of the present disclosure.

A foreign matter discharging groove according to a sixth example will be described with reference to FIGS. 15 and 16. FIG. 15 is a partially enlarged view of the side view of a seal ring according to the sixth example of the present disclosure in which the vicinity of an abutment joint part and foreign matter discharging grooves is enlarged. FIG. 16 is a schematic cross-sectional view of the seal ring according to the sixth example of the present disclosure in which a C-C cross section in FIG. 15 is shown. Note that since basic configurations and operations are the same as those of the first example, the same constituents will be denoted by the same symbols and their descriptions will be omitted appropriately.

As described in the above embodiment, foreign matter discharging grooves 133 are provided on both sides of an abutment joint part 110 in the circumferential direction on the lateral surface on the side of the sliding surface of a seal ring 100. Like the first example, the foreign matter discharging grooves 133 according to the present example are configured to linearly extend from the inner peripheral surface of the seal ring 100 toward an outside in the radial direction up to a position not reaching the outer peripheral surface of the seal ring 100. Thus, even if foreign matter intrudes from the place between an end surface 115 and an end surface 116 of the abutment joint part 110 in an arrow X direction when the seal ring 100 rotates in a clockwise direction in FIG. 15 relative to an annular groove 210, the foreign matter is caught by the foreign matter discharging groove 133. Further, the caught foreign matter flows from the foreign matter discharging groove 133 in an arrow Y direction and discharged to the outside of a sliding part.

Here, in the present example, the foreign matter discharging grooves 133 have, in the circumferential direction, a foreign matter introduction groove 133a that guides foreign matter into the foreign matter discharging grooves 133 on their side on which the abutment joint part 110 is provided. Thus, foreign matter is stably guided into the foreign matter discharging grooves 133. Note that the groove bottoms of the foreign matter introduction grooves 133a are configured by planar inclined surfaces gradually made shallower from the side of the abutment joint part 110 to the foreign matter discharging grooves 133. However, the groove bottoms of the foreign matter introduction grooves 133a are made shallower than those of the foreign matter discharging grooves 133 (see FIG. 16).

In addition, since the foreign matter discharging grooves 133 according to the present example do not communicate with the outer peripheral surface of the seal ring 100, the leakage of sealed fluid from the foreign matter discharging grooves 133 can be prevented. Moreover, the foreign matter discharging grooves 133 according to the present example are provided at a position that falls within a sliding region S (see FIG. 9) in which the seal ring 100 slides on a lateral wall surface 211 on the lower pressure side (L) of an annular groove 210. Note that in FIG. 15, the inside in the radial direction of dashed lines M corresponds to the sliding region S in which the seal ring 100 slides on the lateral wall surface 211. In addition, the present example is configured such that a range in which dynamic pressure generation grooves 121 are provided falls within a range in which the foreign matter discharging grooves 133 are provided when seen in the circumferential direction. Accordingly, the same effects as those of the first example can be obtained.

Note that the foreign matter introduction grooves 133a described in the present example are also applicable to the foreign matter discharging grooves 132 described in the above third example.

Seventh Example

Figure 17:
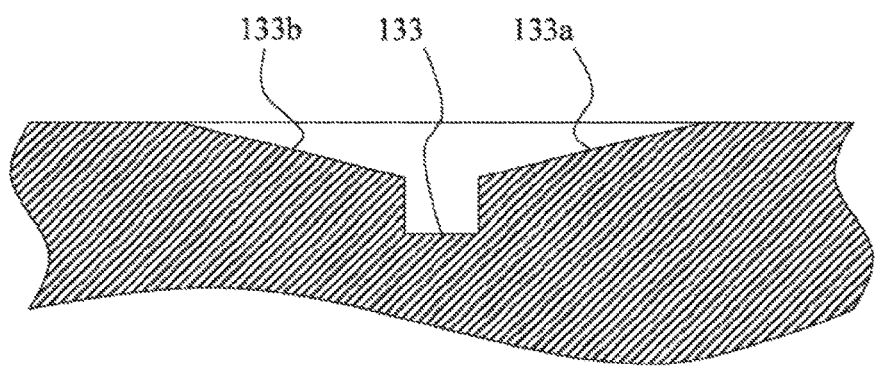
FIG. 17 is a partially enlarged view of the side view of a seal ring according to a seventh example of the present disclosure.

FIG. 17 shows a seventh example of the present disclosure. FIG. 17 is a schematic cross-sectional view of a seal ring according to the seventh example of the present disclosure. The present example describes a modified example of the above sixth example. Note that since basic configurations and operations are the same as those of the sixth example, the same constituents will be denoted by the same symbols and their descriptions will be omitted appropriately.

In the present example, foreign matter discharging grooves 133 have, besides a configuration described in the above sixth example, an auxiliary dynamic pressure generation groove 133b that generates dynamic pressure on a side opposite to their side on which an abutment joint part 110 is provided in a circumferential direction. Thus, the auxiliary dynamic pressure generation grooves 133b can also generate dynamic pressure.

Note that the auxiliary dynamic pressure generation grooves 133b described in the present example are also applicable to the foreign matter discharging grooves 131 described in the first example and the foreign matter discharging grooves 132 described in the third example.

Eighth Example

Figure 18:
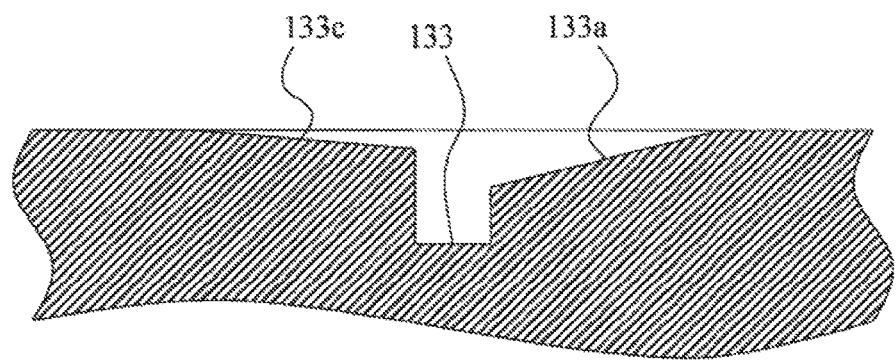
FIG. 18 is a schematic cross-sectional view of a seal ring according to an eighth example of the present disclosure.

FIG. 18 shows an eighth example of the present disclosure. FIG. 18 is a schematic cross-sectional view of a seal ring according to the eighth example of the present disclosure. The present example describes a modified example of the above seventh example. Since basic configurations and operations are the same as those of the seventh example, the same constituents will be denoted by the same symbols and their descriptions will be omitted appropriately.

In the above seventh example, the groove bottoms of the foreign matter introduction grooves 133a are set to have the same depth as that of the groove bottoms of the auxiliary dynamic pressure generation grooves 133b. On the other hand, in the present example, the groove bottoms of auxiliary dynamic pressure generation grooves 133c are set to have a groove depth smaller than that of the groove bottoms of foreign matter introduction grooves 133a. Thus, the release of foreign matter caught by the foreign matter discharging grooves 133 into the auxiliary dynamic pressure generation grooves 133c is prevented. Note that when the groove bottoms of the auxiliary dynamic pressure generation grooves 133c are set to have a groove depth smaller than the size of foreign matter possibly contained in sealed fluid, the release of the foreign matter into the auxiliary dynamic pressure generation grooves 133c can be more reliably prevented.

Ninth Example

Figure 19:
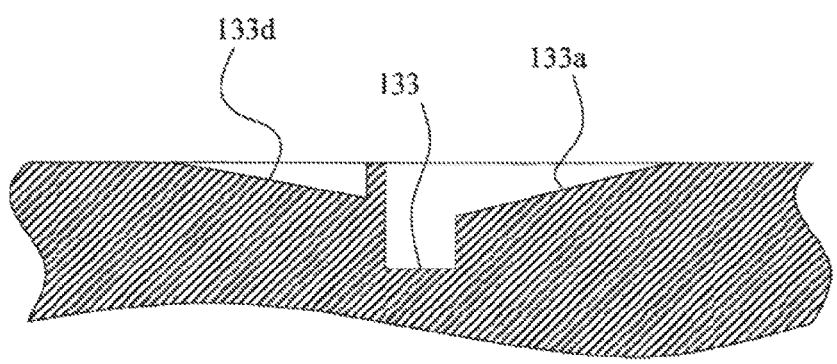
FIG. 19 is a partially enlarged view of the side view of a seal ring according to a ninth example of the present disclosure.

FIG. 19 shows a ninth example of the present disclosure. FIG. 19 is a schematic cross-sectional view of a seal ring according to the ninth example of the present disclosure. The present example describes a modified example of the above eighth example. Note that since basic configurations and operations are the same as those of the eighth example, the same constituents will be denoted by the same symbols and their descriptions will be omitted appropriately.

The present example is the same as the eighth example in the basic configurations, but is different from the above eighth example only in that auxiliary dynamic pressure generation grooves 133d are provided at a position slightly away from foreign matter discharging grooves 133. Since partition walls exist between the auxiliary dynamic pressure generation grooves 133d and the foreign matter discharging grooves 133 in the present example, the release of foreign matter caught by the foreign matter discharging grooves 133 into the auxiliary dynamic pressure generation grooves 133d can be more reliably prevented.

(Other)

In the above respective first to ninth examples, the groove parts 120 and the foreign matter discharging grooves 130, 131, 132, and 133 are provided only on one surface of the seal rings 100. However, the groove parts 120 and the foreign matter discharging grooves 130, 131, 132, and 133 may be provided on both surfaces of the seal rings 100. In short, a surface on which the groove parts 120 and the foreign matter discharging grooves 130, 131, 132, and 133 are provided may serve as a sliding surface.

Second Embodiment

Figure 20:
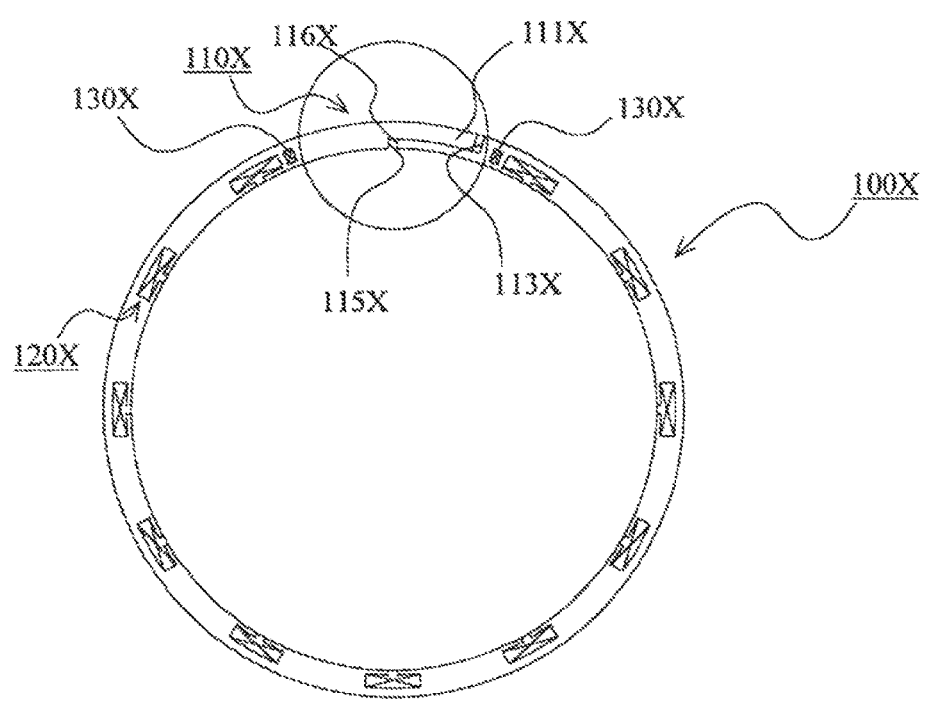
FIG. 20 is a side view of a seal ring according to a second embodiment of the present disclosure.
Figure 21:
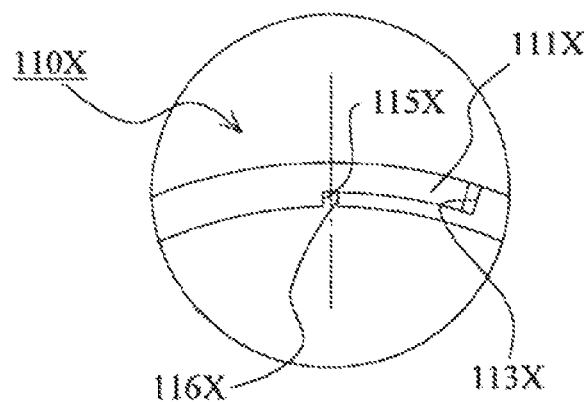
FIG. 21 is a partially enlarged view of the side view of the seal ring according to the second embodiment of the present disclosure.
Figure 22:
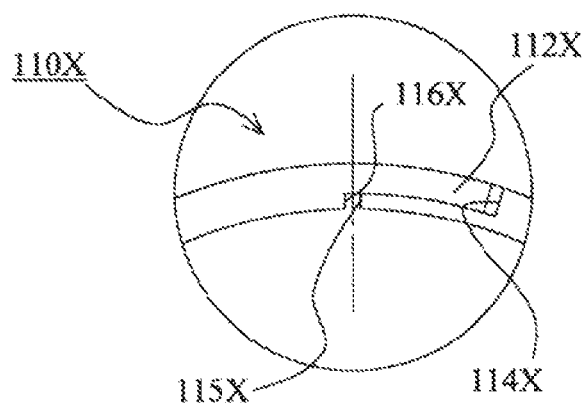
FIG. 22 is a partially enlarged view of the side view of the seal ring according to the second embodiment of the present disclosure.
Figure 23:
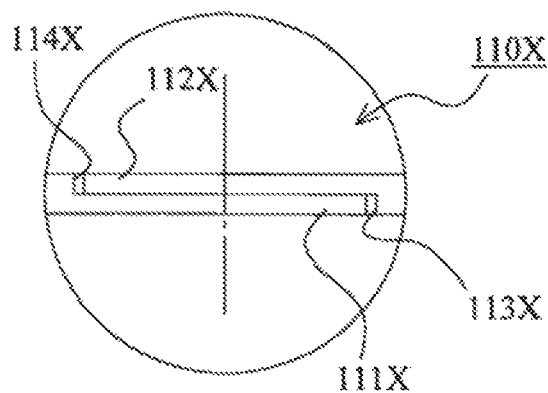
FIG. 23 is a partially enlarged view of the seal ring according to the second embodiment of the present disclosure when seen from the side of its outer peripheral surface.
Figure 24:
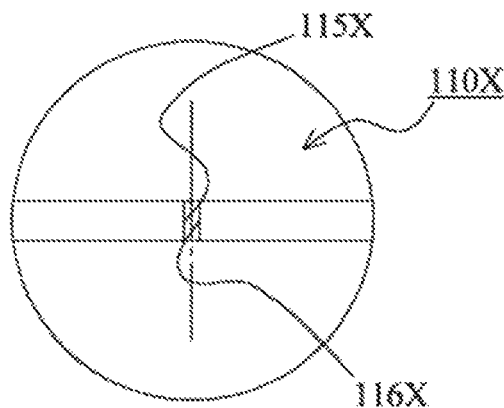
FIG. 24 is a partially enlarged view of the seal ring according to the second embodiment of the present disclosure when seen from the side of its inner peripheral surface.
Figure 25:
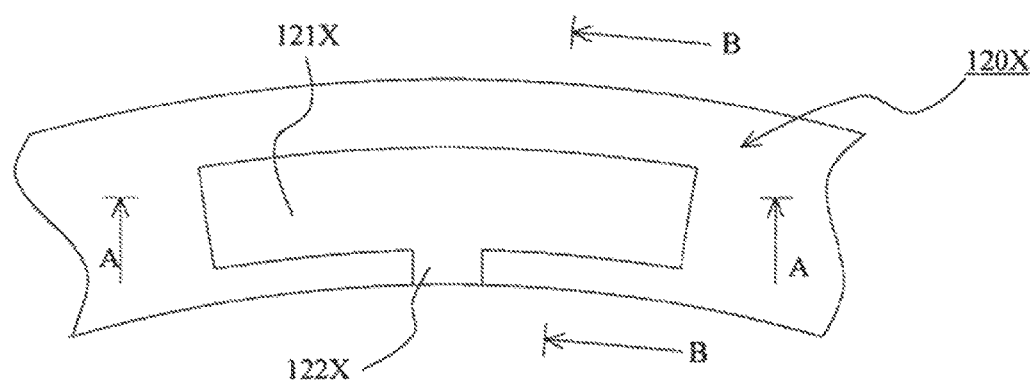
FIG. 25 is a partially enlarged view of the side view of the seal ring according to the second embodiment of the present disclosure.
Figure 26:
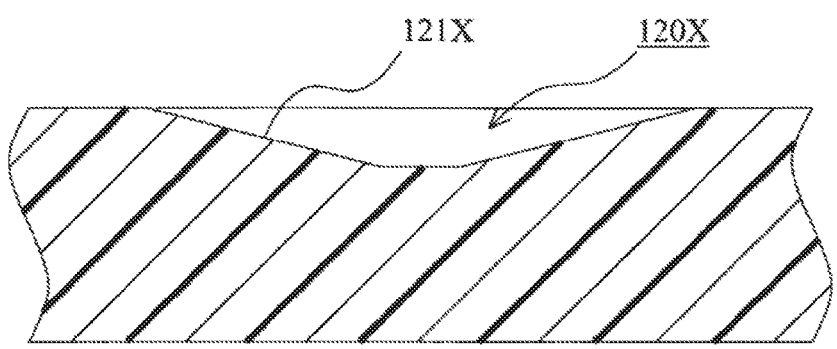
FIG. 26 is a schematic cross-sectional view of the seal ring according to the second embodiment of the present disclosure.
Figure 27:
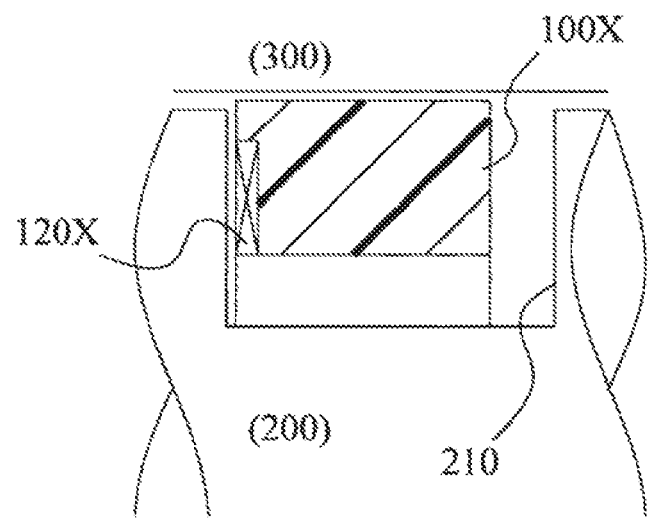
FIG. 27 is a schematic cross-sectional view showing a state in which the seal ring according to the second embodiment of the present disclosure is in use.
Figure 28:
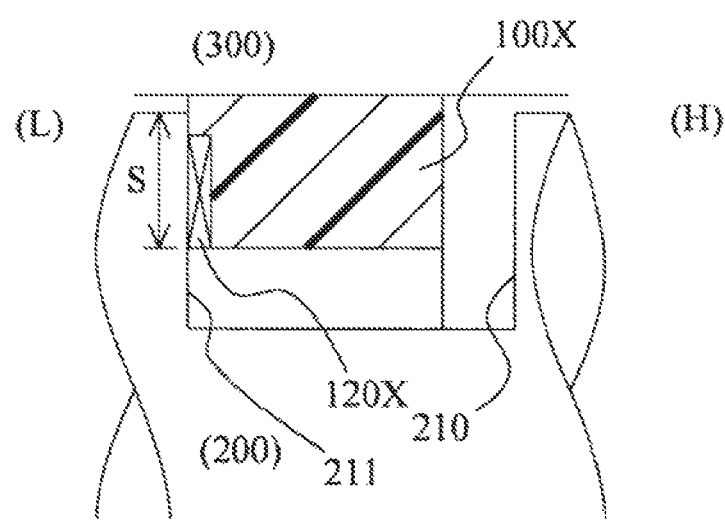
FIG. 28 is a schematic cross-sectional view showing a state in which the seal ring according to the second embodiment of the present disclosure is in use.

A seal ring according to a second embodiment of the present disclosure will be described with reference to FIGS. 20 to 28. FIG. 20 is a side view of the seal ring according to the second embodiment of the present disclosure. FIG. 21 is a partially enlarged view of the side view of the seal ring according to the second embodiment of the present disclosure in which a part surrounded by a circle in FIG. 20 is enlarged. FIG. 22 is a partially enlarged view of the side view of the seal ring according to the second embodiment of the present disclosure in which the part surrounded by the circle in FIG. 20 is seen from the opposite side of the seal ring. FIG. 23 is a partially enlarged view of the seal ring according to the second embodiment of the present disclosure when seen from the side of its outer peripheral surface in which the part surrounded by the circle in FIG. 20 is seen from the side of the outer peripheral surface. FIG. 24 is a partially enlarged view of the seal ring according to the second embodiment of the present disclosure when seen from the side of its inner peripheral surface in which the part surrounded by the circle in FIG. 20 is seen from the side of the inner peripheral surface. FIG. 25 is a partially enlarged view of the side view of the seal ring according to the second embodiment of the present disclosure in which the vicinity of a dynamic pressure generation groove is enlarged. FIG. 26 is a schematic cross-sectional view of the seal ring according to the second embodiment of the present disclosure in which an A-A cross section in FIG. 25 is shown. FIGS. 27 and 28 are schematic cross-sectional views showing states where the seal ring according to the second embodiment of the present disclosure is in use. Note that FIG. 27 shows a state in which no load is generated and FIG. 28 shows a state in which differential pressure is generated. In addition, the seal ring in FIGS. 27 and 28 corresponds to a B-B cross section in FIG. 25.

<Configuration of Seal Ring>

A seal ring 100X according to the present embodiment is attached to an annular groove 210 provided on the outer periphery of a shaft 200 and seals the annular gap between the shaft 200 and a housing 300 (the inner peripheral surface of a shaft hole in which the shaft 200 is to be inserted in the housing 300) that rotate relative to each other. Thus, the seal ring 100X maintains fluid pressure in a sealed region in which the fluid pressure (hydraulic pressure in the present embodiment) is configured to change. Here, in the present embodiment, fluid pressure in a region on the right side of the seal ring 100X in FIGS. 27 and 28 is configured to change. Further, the seal ring 100X plays a role in maintaining the fluid pressure in the sealed region on the right side in the figure via the seal ring 100X. Note that the fluid pressure in the sealed region is low and no load is generated when the engine of an automobile is stopped, whereas the fluid pressure in the sealed region becomes high when the engine is started. In addition, FIG. 28 shows a state in which the fluid pressure on the right side becomes higher than the fluid pressure on the left side. Hereinafter, the right side and the left side in FIG. 28 will be indicated as a higher pressure side (H) and a lower pressure side (L), respectively.

Further, the seal ring 100X is made of a resin material such as polyether ether ketone (PEEK), polyphenylenesulfide (PPS), and polytetrafluoroethylene (PTFE). In addition, the outer peripheral surface of the seal ring 100X is configured to have a peripheral length shorter than that of the inner peripheral surface of the shaft hole of the housing 300 and configured not to have interference. Accordingly, in a state in which the fluid pressure does not act, the outer peripheral surface of the seal ring 100X could be separated from the inner peripheral surface of the shaft hole of the housing 300 (see FIG. 27).

The seal ring 100X has an abutment joint part 110X at one portion in its circumferential direction. In addition, the seal ring 100X has groove parts 120X having a dynamic pressure generation groove 121X and foreign matter discharging holes 130X on the side of its sliding surface. Note that the seal ring 100X according to the present embodiment is configured to form the above abutment joint part 110X, the plurality of groove parts 120X, and the plurality of foreign matter discharging holes 130X in an annular member having a rectangle cross section. However, the configuration merely describes the shape of the seal ring 100X and does not necessarily imply that the abutment joint part 110X, the plurality of groove parts 120X, and the plurality of foreign matter discharging holes 130X are formed using an annular member having a rectangle cross section as a material. Of course, these parts can be obtained by cutting after an annular member having a rectangle cross section is molded. However, for example, the plurality of groove parts 120X and the plurality of foreign matter discharging holes 130X may be obtained by cutting after one having the abutment joint part 110X is molded in advance, and its manufacturing method is not particularly limited.

The configuration of the abutment joint part 110X according to the present embodiment will be described with particular reference to FIGS. 21 to 24. The abutment joint part 110X according to the present embodiment employs a special step cut with which the abutment joint part 110X is cut off in a staircase pattern when seen from any of the side of the outer peripheral surface and the sides of both lateral wall surfaces. Thus, in the seal ring 100X, a first fitting convex part 111X and a first fitting concave part 114X are provided on the side of the outer peripheral surface on one side via a cutting part, whereas a second fitting concave part 113X in which the first fitting convex part 111X is to be fitted and a second fitting convex part 112X that is to be fitted in the first fitting concave part 114X are provided on the side of the outer peripheral surface on the other side via the cutting part. Note that an end surface 115X on the side of the inner peripheral surface on the one side and an end surface 116X on the side of the inner periphery on the other side face each other via the cutting part. The special step cut is known technology, and thus its detailed description will be omitted. However, the special step cut has the property of maintaining stable sealing performance even if the circumferential length of the seal ring 100X changes due to its thermal expansion/contraction. Note that the "cutting part" includes not only a cutting part cut off by cutting but also a cutting part obtained by molding.

The groove parts 120X are provided in plurality at even intervals over a circumference of a lateral surface of the seal ring 100X on the side of the sliding surface, excluding the vicinity of the abutment joint part 110X (see FIG. 20). The plurality of groove parts 120X is provided to generate dynamic pressure when the seal ring 100X slides on a lateral wall surface 211 on the lower pressure side (L) in the annular groove 210 provided on the shaft 200.

Further, the groove parts 120X have the dynamic pressure generation groove 121X that extends in the circumferential direction and an introduction groove 122X that extends from a central position in the circumferential direction of the dynamic pressure generation groove 121X to the inner peripheral surface and guides sealed fluid into the dynamic pressure generation groove 121X (see FIG. 25). In addition, the dynamic pressure generation grooves 121X are configured to have a groove bottom made shallower at their ends in the circumferential direction than at their center in the circumferential direction. In the present embodiment, the groove bottoms of the dynamic pressure generation grooves 121X are configured by planar inclined surfaces (see FIG. 26). However, the dynamic pressure generation grooves 121X are not limited to those exemplified in the figure, and various known technologies can be employed so long as the dynamic pressure generation grooves 121X have the function of generating dynamic pressure when sealed fluid is discharged from the inside of the grooves to the sliding part. In addition, the groove parts 120X are provided at a position that falls within a sliding region S in which the seal ring 100X slides on the lateral wall surface 211 on the lower pressure side (L) (see FIG. 28). Accordingly, the leakage of sealed fluid from the groove parts 120X to the lower pressure side (L) is prevented.

In addition, the foreign matter discharging holes 130X are provided on the lateral surface on the side of the sliding surface of the seal ring 100X as described above. The foreign matter discharging holes 130X are provided between a region in which the plurality of dynamic pressure generation grooves 121X (the groove parts 120X having the dynamic pressure generation groove 121X) is arranged and the abutment joint part 110X in the circumferential direction. Further, the foreign matter discharging holes 130X are provided to catch foreign matter intruding from the abutment joint part 110X and discharge the caught foreign matter to the side of the inner peripheral surface of the seal ring 100X. In addition, the foreign matter discharging holes 130X are each configured to have a groove depth greater than that of the dynamic pressure generation grooves 121X. Moreover, in the present embodiment, the foreign matter discharging holes 130X are provided on both sides of the abutment joint part 110X in the circumferential direction. Note that the foreign matter discharging holes 130X are not through-holes, are provided at a position away from the inner peripheral surface and the outer peripheral surface of the seal ring 100X, and are provided at a position away from the abutment joint part 110X and the dynamic pressure generation grooves 121X.

<Mechanism where Seal Ring is in Use>

A mechanism where the seal ring 100X according to the present embodiment is in use will be described with particular reference to FIGS. 27 and 28. Since there is no differential pressure between the right and left regions as shown in FIG. 27 in a no load state in which an engine is stopped, the seal ring 100X could be separated from a lateral wall surface on the left side in the figure of the annular groove 210 and the inner peripheral surface of the shaft hole of the housing 300.

FIG. 28 shows a state in which differential pressure is generated (the pressure on the right side becomes higher than the pressure on the left side in the figure) via the seal ring 100X with the start of the engine. When the differential pressure is generated with the start of the engine, the seal ring 100X is brought into intimate contact with the lateral wall surface 211 on the lower pressure side (L) of the annular groove 210 and the inner peripheral surface of the shaft hole of the housing 300.

Thus, it becomes possible to seal the annular gap between the shaft 200 and the housing 300 that rotate relative to each other to maintain fluid pressure in the sealed region (the region on the higher pressure side (H)) in which the fluid pressure is configured to change. Further, when the shaft 200 and the housing 300 rotate relative to each other, the seal ring 100X slides on the lateral wall surface 211 on the lower pressure side (L) of the annular groove 210. Further, dynamic pressure is generated when sealed fluid flows out to the sliding part from the dynamic pressure generation grooves 121X of the groove parts 120X provided on the lateral surface on the side of the sliding surface of the seal ring 100X. Note that when the seal ring 100X rotates in a clockwise direction in FIG. 20 relative to the annular groove 210, the sealed fluid flows out to the sliding part from the ends in a counterclockwise direction of the dynamic pressure generation grooves 121X. In addition, when the seal ring 100X rotates in the counterclockwise direction in FIG. 20 relative to the annular groove 210, the sealed fluid flows out to the sliding part from the ends in the clockwise direction of the dynamic pressure generation grooves 121X.

In addition, in the abutment joint part 110X, a gap is formed between the end surface 115X on the side of the inner peripheral surface on the one side and the end surface 116X on the side of the inner periphery on the other side via the cutting part. Accordingly, there is a likelihood that foreign matter intrudes from the gap. However, in the present embodiment, foreign matter intruding from the abutment joint part 110X is caught by the foreign matter discharging holes 130X and discharged to the side of the inner peripheral surface of the seal ring 100X as described above.

<Excellent Point of Seal Ring According to Present Embodiment>

In the seal ring 100X according to the present embodiment, foreign matter is caught by the foreign matter discharging holes 130X and discharged to the side of the inner peripheral surface of the seal ring 100X even if the foreign matter intrudes from the abutment joint part 110X as described above. Therefore, the intrusion of foreign matter into the dynamic pressure generation grooves 121X can be prevented. Thus, the impairment of the dynamic pressure generation function of the dynamic pressure generation grooves 121X due to foreign matter can be prevented, and the acceleration of wear-out due to foreign matter can be prevented.

In addition, in the present embodiment, the foreign matter discharging holes 130X are provided on both sides of the abutment joint part 110X in the circumferential direction. Thus, foreign matter is caught by the foreign matter discharging holes 130 and discharged to the side of the inner peripheral surface of the seal ring 100X regardless of the rotating direction of the seal ring 100X relative to the annular groove 210.

Hereinafter, more specific examples (tenth and eleventh examples) of the foreign matter discharging holes will be described.

Tenth Example

Figure 29:
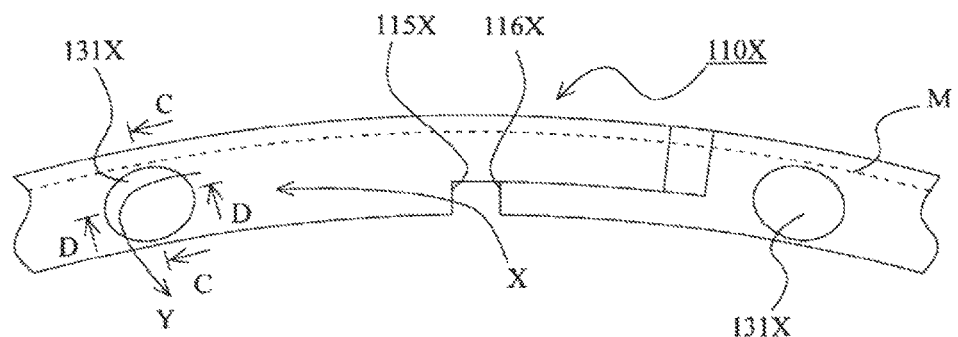
FIG. 29 is a partially enlarged view of the side view of a seal ring according to a tenth example of the present disclosure.
Figure 30:
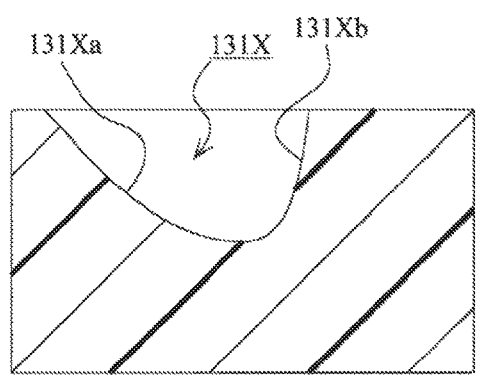
FIG. 30 is a schematic cross-sectional view of the seal ring according to the tenth example of the present disclosure.
Figure 31:
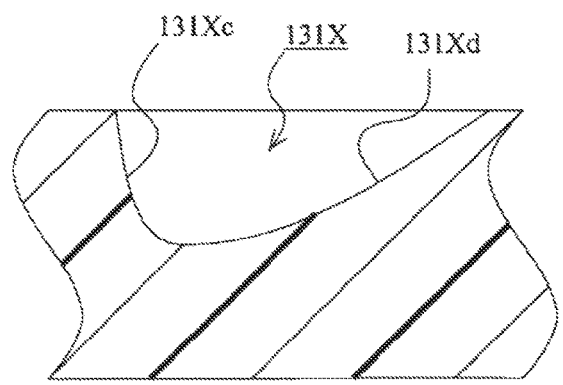
FIG. 31 is a schematic cross-sectional view of the seal ring according to the tenth example of the present disclosure.

A foreign matter discharging hole according to a tenth example of the present disclosure will be described with reference to FIGS. 29 to 31. FIG. 29 is a partially enlarged view of the side view of the seal ring according to the tenth example of the present disclosure in which the vicinity of an abutment joint part and foreign matter discharging holes is enlarged. FIGS. 30 and 31 are schematic cross-sectional views of the seal ring according to the tenth example of the present disclosure. Note that FIG. 30 shows a C-C cross section in FIG. 29 and FIG. 31 shows a D-D cross section in FIG. 29.

As described in the above second embodiment, foreign matter discharging holes 131X are provided on both sides of an abutment joint part 110X in the circumferential direction on the lateral surface on the side of the sliding surface of a seal ring 100X. Thus, even if foreign matter intrudes from the place between an end surface 115X and an end surface 116X of the abutment joint part 110X in an arrow X direction when the seal ring 100X rotates in a clockwise direction in FIG. 29 relative to an annular groove 210, the foreign matter is caught by the foreign matter discharging hole 131X. Further, the caught foreign matter flows from the foreign matter discharging hole 131X in an arrow Y direction and discharged to the side of the inner peripheral surface of the seal ring 100X.

In addition, since the foreign matter discharging holes 131X according to the present example do not communicate with the outer peripheral surface of the seal ring 100X, the leakage of sealed fluid from the foreign matter discharging holes 131X can be prevented. Moreover, the foreign matter discharging holes 131X according to the present example are provided at a position that falls within a sliding region S (see FIG. 28) in which the seal ring 100X slides on a lateral wall surface 211 on the lower pressure side (L) of the annular groove 210. Thus, the leakage of sealed fluid from the foreign matter discharging holes 131X can be more reliably prevented. Note that in FIG. 29, the inside in the radial direction of dashed lines M corresponds to the sliding region S in which the seal ring 100X slides on the lateral wall surface 211.

Here, the foreign matter discharging holes 131X are configured such that an inclined surface 131Xb on a side closer to the side of an outer peripheral surface relative to its deepest position has greater inclination than that of an inclined surface 131Xa on the side of an inner peripheral surface, and an inclined surface 131Xc on a side opposite to the abutment joint part 110X relative to the deepest position has greater inclination than that of an inclined surface 131Xd on the side of the abutment joint part 110X. Thus, since sealed fluid intruding from the side of the abutment joint part 110X into the foreign matter discharging holes 131X flows toward the side of the inner peripheral surface, foreign matter caught by the foreign matter discharging holes 131X is discharged to the side of the inner peripheral surface of the seal ring 100X.

Eleventh Example

Figure 32:
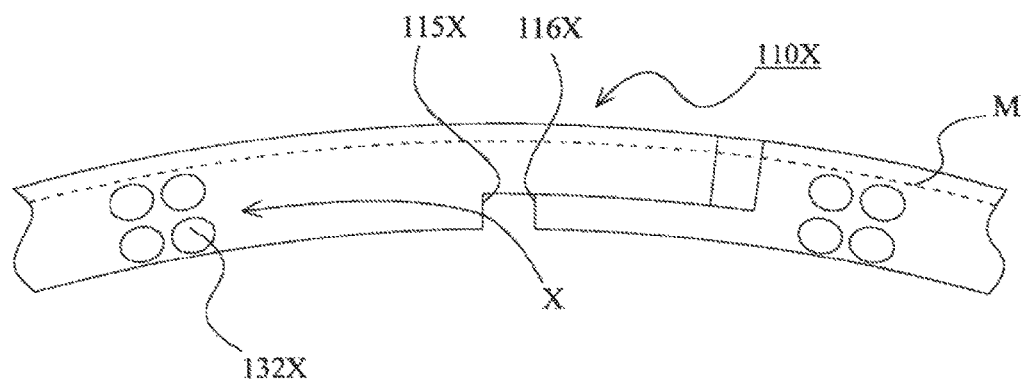
FIG. 32 is a partially enlarged view of the side view of a seal ring according to an eleventh example of the present disclosure.

FIG. 32 shows an eleventh example of the present disclosure. FIG. 32 is a partially enlarged view of the side view of a seal ring according to the eleventh example of the present disclosure in which the vicinity of an abutment joint part and foreign matter discharging holes is enlarged. Note that since basic configurations and operations are the same as those of the tenth example, the same constituents will be denoted by the same symbols and their descriptions will be omitted appropriately.

In a seal ring 100X according to the present example, four foreign matter discharging holes 132X are provided side by side on both sides of an abutment joint part 110X in the circumferential direction. In the present example, the foreign matter discharging holes 132X are smaller in size than the foreign matter discharging holes 131X of the tenth example. Note that in the present example as well, the foreign matter discharging holes 132X are configured such that an inclined surface on a side closer to the side of an outer peripheral surface relative to its deepest position has greater inclination than that of an inclined surface on the side of an inner peripheral surface, and an inclined surface on a side opposite to the abutment joint part 110X relative to the deepest position has greater inclination than that of an inclined surface on the side of the abutment joint part 110X. Thus, since sealed fluid intruding from the side of the abutment joint part 110X into the foreign matter discharging holes 132X flows toward the side of the inner peripheral surface, the foreign matter caught by the foreign matter discharging holes 132X is discharged to the side of the inner peripheral surface of the seal ring 100X. As described above, a configuration in which the plurality of foreign matter discharging holes 132X is provided side by side can be employed. Note that the number of the arranged foreign matter discharging holes 132X can be set appropriately.

(Other)

In the above respective tenth and eleventh examples, the groove parts 120X and the foreign matter discharging holes 130X, 131X, and 132X are provided only on one surface of the seal rings 100X. However, the groove parts 120X and the foreign matter discharging holes 130X, 131X, and 132X may be provided on both surfaces of the seal rings 100X. In short, a surface on which the groove parts 120X and the foreign matter discharging holes 130X, 131X, and 132X are provided may serve as a sliding surface.

Twelfth Example

Figure 33:
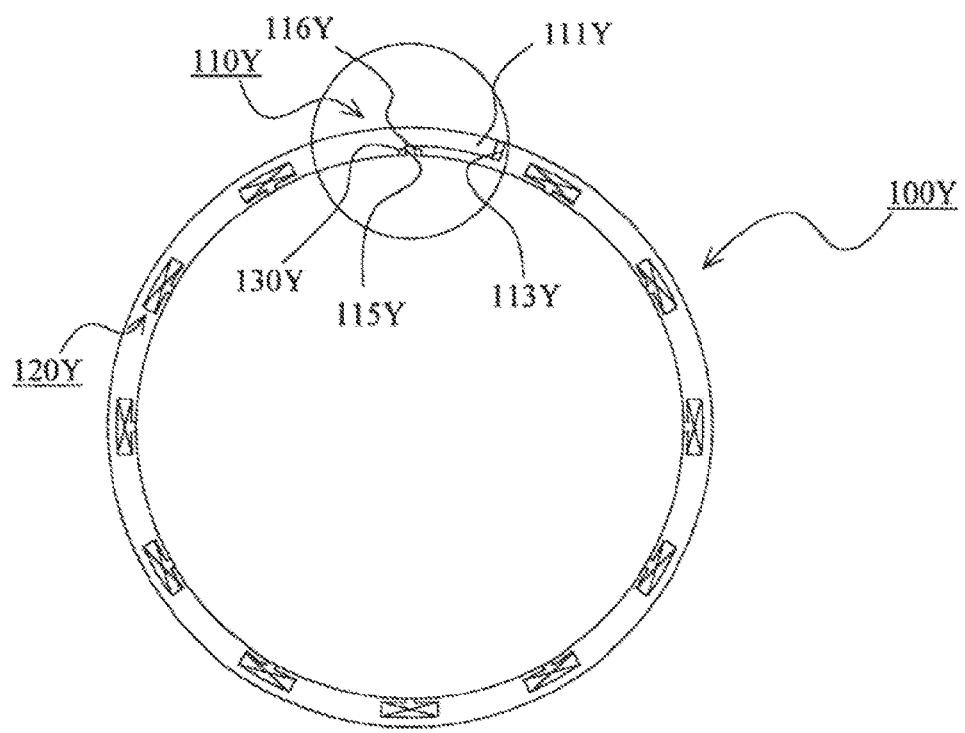
FIG. 33 is a side view of a seal ring according to a twelfth example of the present disclosure.
Figure 34:
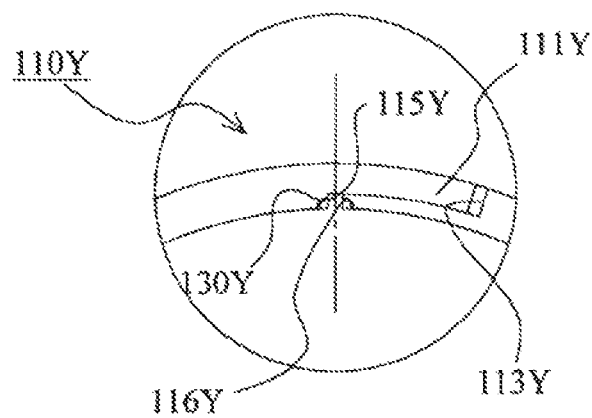
FIG. 34 is a partially enlarged view of the side view of the seal ring according to the twelfth example of the present disclosure.
Figure 35:
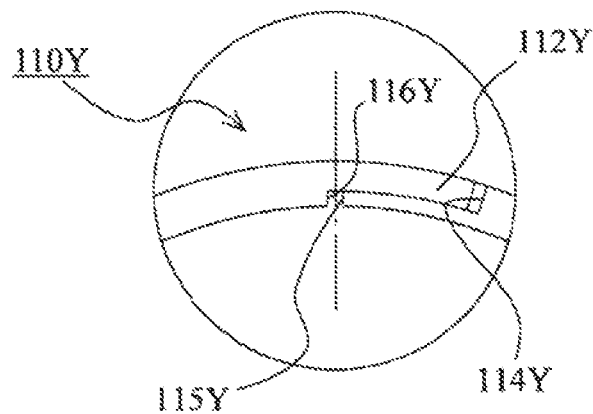
FIG. 35 is a partially enlarged view of the side view of the seal ring according to the twelfth example of the present disclosure.
Figure 36:
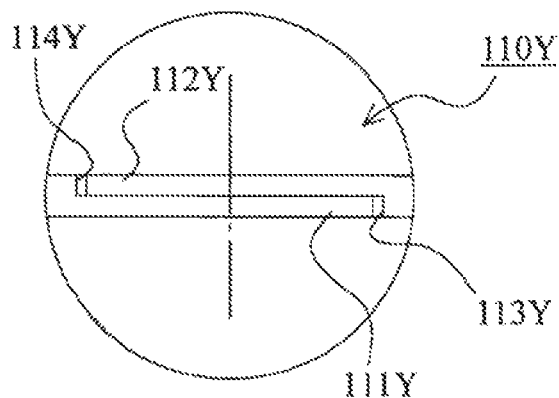
FIG. 36 is a partially enlarged view of the seal ring according to the twelfth example of the present disclosure when seen from the side of its outer peripheral surface.
Figure 37:
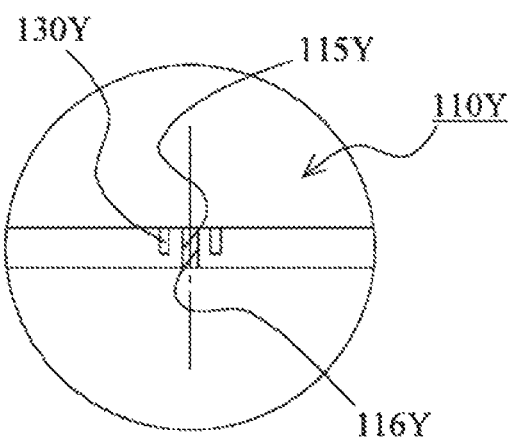
FIG. 37 is a partially enlarged view of the seal ring according to the twelfth example of the present disclosure when seen from the side of its inner peripheral surface.
Figure 38:
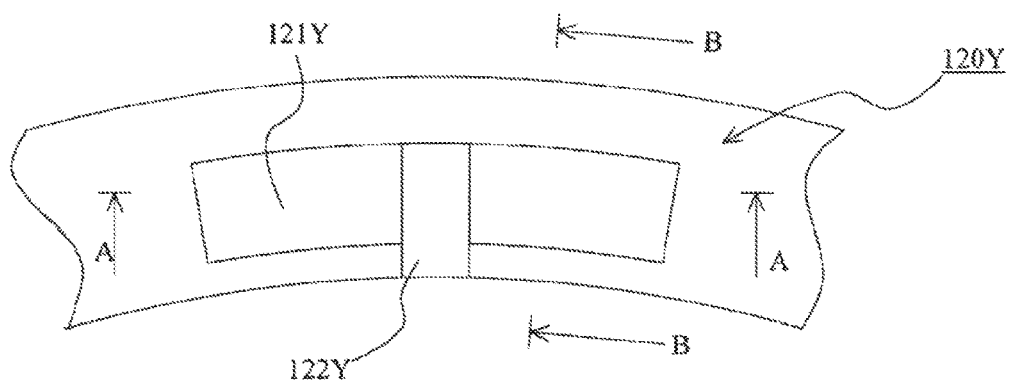
FIG. 38 is a partially enlarged view of the side view of the seal ring according to the twelfth example of the present disclosure.
Figure 39:
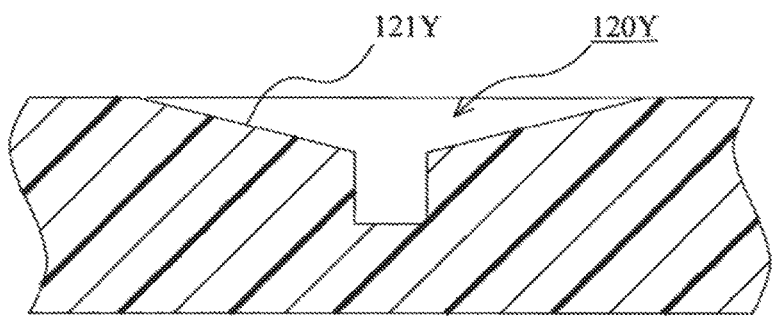
FIG. 39 is a schematic cross-sectional view of the seal ring according to the twelfth example of the present disclosure.
Figure 40:
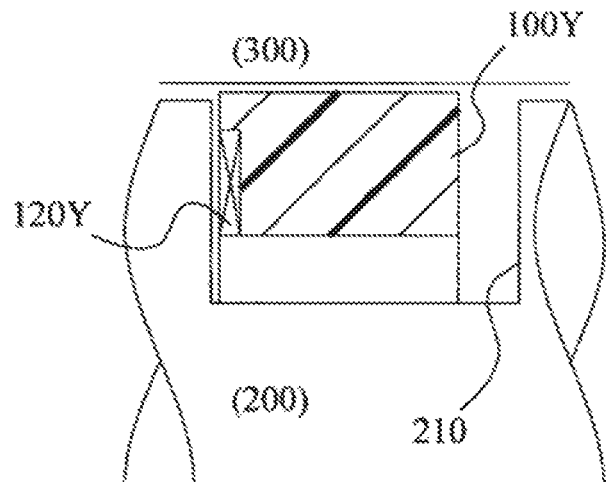
FIG. 40 is a schematic cross-sectional view showing a state in which the seal ring according to the twelfth example of the present disclosure is in use.
Figure 41:
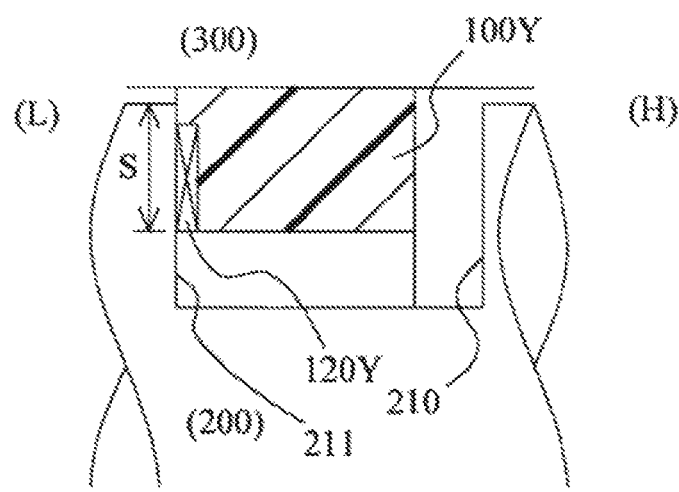
FIG. 41 is a schematic cross-sectional view showing a state in which the seal ring according to the twelfth example of the present disclosure is in use.
Figure 42:
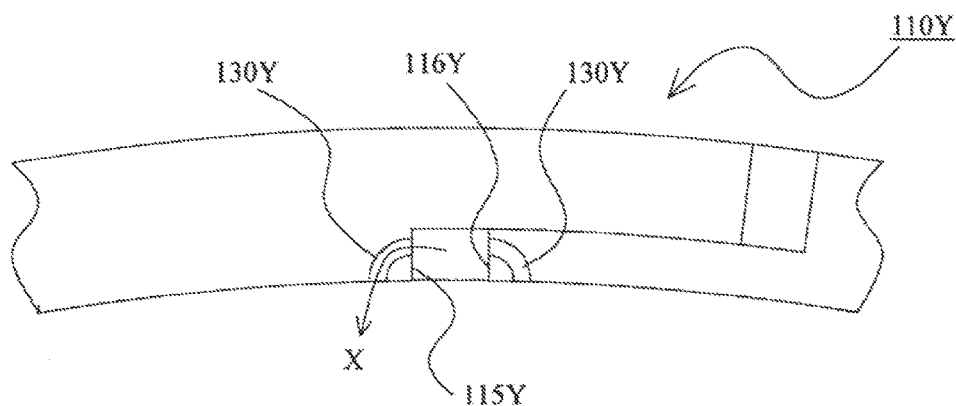
FIG. 42 is a partially enlarged view of the side view of the seal ring according to the twelfth example of the present disclosure.
Figure 43:
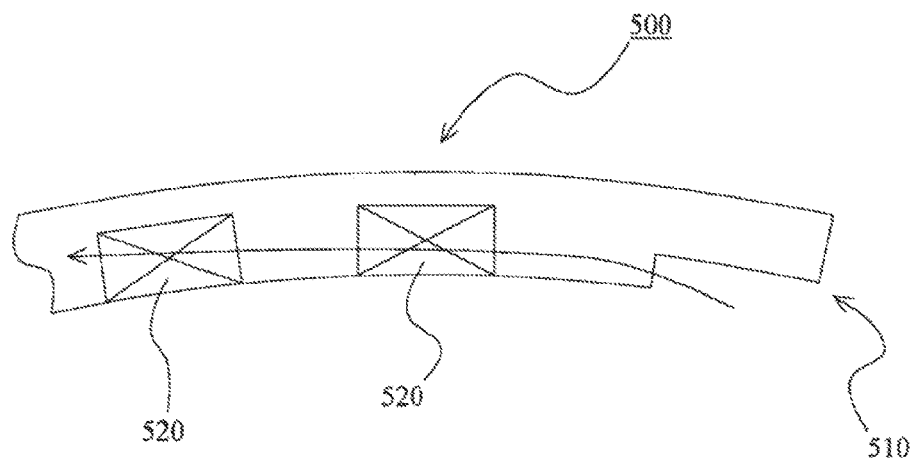
FIG. 43 is a partially enlarged view of the side view of a seal ring according to a conventional example.

A seal ring according to a twelfth example of the present disclosure will be described with reference to FIGS. 33 to 42. FIG. 33 is a side view (schematically-shown side view) of the seal ring according to the twelfth example of the present disclosure. FIG. 34 is a partially enlarged view of the side view of the seal ring according to the twelfth example of the present disclosure in which a part surrounded by a circle in FIG. 33 is enlarged. FIG. 35 is a partially enlarged view of the side view of the seal ring according to the twelfth example of the present disclosure in which the part surrounded by the circle in FIG. 33 is seen from the opposite side of the seal ring. FIG. 36 is a partially enlarged view of the seal ring according to the twelfth example of the present disclosure when seen from the side of its outer peripheral surface in which the part surrounded by the circle in FIG. 33 is seen from the side of the outer peripheral surface. FIG. 37 is a partially enlarged view of the seal ring according to the twelfth example of the present disclosure when seen from the side of its inner peripheral surface in which the part surrounded by the circle in FIG. 33 is seen from the side of the inner peripheral surface. FIG. 38 is a partially enlarged view of the side view of the seal ring according to the twelfth example of the present disclosure in which the vicinity of a dynamic pressure generation groove is enlarged. FIG. 39 is a schematic cross-sectional view of the seal ring according to the twelfth example of the present disclosure in which an A-A cross section in FIG. 38 is shown. FIGS. 40 and 41 are schematic cross-sectional views showing states where the seal ring according to the twelfth example of the present disclosure is in use. Note that FIG. 40 shows a state in which no load is generated and FIG. 41 shows a state in which differential pressure is generated. In addition, the seal ring in FIGS. 40 and 41 corresponds to a B-B cross section in FIG. 38. FIG. 42 is a partially enlarged view of the side view of the seal ring according to the twelfth example of the present disclosure in which the part surrounded by the circle in FIG. 33 is enlarged on a greater scale than that of FIG. 34.

<Configuration of Seal Ring>

A seal ring 100Y according to the present example is attached to an annular groove 210 provided on the outer periphery of a shaft 200 and seals the annular gap between the shaft 200 and a housing 300 (the inner peripheral surface of a shaft hole in which the shaft 200 is to be inserted in the housing 300) that rotate relative to each other. Thus, the seal ring 100Y maintains fluid pressure in a sealed region in which the fluid pressure (hydraulic pressure in the present example) is configured to change. Here, in the present example, fluid pressure in a region on the right side of the seal ring 100Y in FIGS. 40 and 41 is configured to change. Further, the seal ring 100Y plays a role in maintaining the fluid pressure in the sealed region on the right side in the figure via the seal ring 100Y. Note that the fluid pressure in the sealed region is low and no load is generated when the engine of an automobile is stopped, whereas the fluid pressure in the sealed region becomes high when the engine is started. In addition, FIG. 41 shows a state in which the fluid pressure on the right side in the figure becomes higher than the fluid pressure on the left side. Hereinafter, the right side and the left side in FIG. 41 will be indicated as a higher pressure side (H) and a lower pressure side (L), respectively.

Further, the seal ring 100Y is made of a resin material such as polyether ether ketone (PEEK), polyphenylenesulfide (PPS), and polytetrafluoroethylene (PTFE). In addition, the outer peripheral surface of the seal ring 100Y is configured to have a peripheral length shorter than that of the inner peripheral surface of the shaft hole of the housing 300 and configured not to have interference. Accordingly, in a state in which the fluid pressure does not act, the outer peripheral surface of the seal ring 100Y could be separated from the inner peripheral surface of the shaft hole of the housing 300 (see FIG. 40).

The seal ring 100Y has an abutment joint part 110Y at one portion in its circumferential direction. In addition, the seal ring 100Y has groove parts 120Y having a dynamic pressure generation groove 121Y and foreign matter discharging grooves 130Y on the side of its sliding surface. Note that the seal ring 100Y according to the present example is configured to form the above abutment joint part 110Y, the plurality of groove parts 120Y, and the plurality of foreign matter discharging grooves 130Y in an annular member having a rectangle cross section. However, the configuration merely describes the shape of the seal ring 100Y and does not necessarily imply that the abutment joint part 110Y, the plurality of groove parts 120Y, and the plurality of foreign matter discharging grooves 130Y are formed using an annular member having a rectangle cross section as a material. Of course, these parts can be obtained by cutting after an annular member having a rectangle cross section is molded. However, for example, the plurality of groove parts 120Y and the plurality of foreign matter discharging grooves 130Y may be obtained by cutting after one having the abutment joint part 110Y is molded in advance, and its manufacturing method is not particularly limited.

The configuration of the abutment joint part 110Y according to the present example will be described with particular reference to FIGS. 34 to 37. The abutment joint part 110Y according to the present example employs a special step cut with which the abutment joint part 110Y is cut off in a staircase pattern when seen from any of the side of the outer peripheral surface and the sides of both lateral wall surfaces. Thus, in the seal ring 100Y, a first fitting convex part 111Y and a first fitting concave part 114Y are provided on the side of the outer peripheral surface on one side via a cutting part, whereas a second fitting concave part 113Y in which the first fitting convex part 111Y is to be fitted and a second fitting convex part 112Y that is to be fitted in the first fitting concave part 114Y are provided on the side of the outer peripheral surface on the other side via the cutting part. Note that an end surface 115Y on the side of the inner peripheral surface on the one side and an end surface 116Y on the side of the inner periphery on the other side face each other via the cutting part. The special step cut is known technology, and thus its detailed description will be omitted. However, the special step cut has the property of maintaining stable sealing performance even if the circumferential length of the seal ring 100Y changes due to its thermal expansion/contraction. Note that the "cutting part" includes not only a cutting part cut off by cutting but also a cutting part obtained by molding.

The groove parts 120Y are provided in plurality at even intervals over a circumference of a lateral surface of the seal ring 100Y on the side of the sliding surface, excluding the vicinity of the abutment joint part 110Y (see FIG. 33). The plurality of groove parts 120Y is provided to generate dynamic pressure when the seal ring 100Y slides on a lateral wall surface 211 on the lower pressure side (L) in the annular groove 210 provided on the shaft 200.

Further, the groove parts 120Y have the dynamic pressure generation groove 121Y that extends in the circumferential direction and an introduction groove 122Y that extends from a central position in the circumferential direction of the dynamic pressure generation groove 121Y to the inner peripheral surface and guides sealed fluid into the dynamic pressure generation groove 121Y (see FIG. 38). In addition, the dynamic pressure generation grooves 121Y are configured to have a groove bottom made shallower at their ends in the circumferential direction than at their center in the circumferential direction. In the present example, the groove bottoms of the dynamic pressure generation grooves 121Y are configured by planar inclined surfaces (see FIG. 39). However, the dynamic pressure generation grooves 121Y are not limited to those exemplified in the figure, and various known technologies can be employed so long as the dynamic pressure generation grooves 121Y have the function of generating dynamic pressure when sealed fluid is discharged from the inside of the grooves to the sliding part. In addition, the groove parts 120Y are provided at a position that falls within a sliding region S in which the seal ring 100Y slides on the lateral wall surface 211 on the lower pressure side (L) (see FIG. 41). Accordingly, the leakage of sealed fluid from the groove parts 120Y to the lower pressure side (L) is prevented.

In addition, the foreign matter discharging grooves 130Y are provided on the lateral surface on the side of the sliding surface of the seal ring 100Y as described above. The foreign matter discharging grooves 130Y are provided on the side of the sliding surface sliding on the lateral wall surface 211 on the lower pressure side (L) of the annular groove 210 and provided to range from the inner peripheral surface of the seal ring 100Y to the end surfaces of the abutment joint part 110Y. Further, the foreign matter discharging grooves 130Y are provided to discharge foreign matter intruding into the gap of the abutment joint part 110Y to the side of the inner peripheral surface of the seal ring 100Y. That is, when the seal ring 100Y rotates in a clockwise direction in FIG. 42 relative to the annular groove 210, foreign matter intruding into the gap of the abutment joint part 110Y flows in an arrow X direction via the foreign matter discharging groove 130Y. The foreign matter discharging grooves 130Y according to the present example is configured by grooves having a circular plane shape. Thus, foreign matter smoothly flows to the side of the inner peripheral surface of the seal ring 100Y.

In addition, the foreign matter discharging grooves 130Y are each configured to have a groove depth greater than that of the dynamic pressure generation grooves 121Y. Moreover, in the present example, the foreign matter discharging grooves 130Y are provided on both sides of the abutment joint part 110Y in the circumferential direction.

<Mechanism where Seal Ring is in Use>

A mechanism where the seal ring 100Y according to the present example is in use will be described with particular reference to FIGS. 40 and 41. Since there is no differential pressure between the right and left regions as shown in FIG. 40 in a no load state in which an engine is stopped, the seal ring 100Y could be separated from a lateral wall surface on the left side in the figure of the annular groove 210 and the inner peripheral surface of the shaft hole of the housing 300.

FIG. 41 shows a state in which differential pressure is generated (the pressure on the right side becomes higher than the pressure on the left side in the figure) via the seal ring 100Y with the start of the engine. When the differential pressure is generated with the start of the engine, the seal ring 100Y is brought into intimate contact with the lateral wall surface 211 on the lower pressure side (L) of the annular groove 210 and the inner peripheral surface of the shaft hole of the housing 300.

Thus, it becomes possible to seal the annular gap between the shaft 200 and the housing 300 that rotate relative to each other to maintain fluid pressure in the sealed region (the region on the higher pressure side (H)) in which the fluid pressure is configured to change. Further, when the shaft 200 and the housing 300 rotate relative to each other, the seal ring 100Y slides on the lateral wall surface 211 on the lower pressure side (L) of the annular groove 210. Further, dynamic pressure is generated when sealed fluid flows out to the sliding part from the dynamic pressure generation grooves 121Y of the groove parts 120Y provided on the lateral surface on the side of the sliding surface of the seal ring 100Y. Note that when the seal ring 100Y rotates in a clockwise direction in FIG. 33 relative to the annular groove 210, the sealed fluid flows out to the sliding part from the ends in a counterclockwise direction of the dynamic pressure generation grooves 121Y. In addition, when the seal ring 100Y rotates in the counterclockwise direction in FIG. 33 relative to the annular groove 210, the sealed fluid flows out to the sliding part from the ends in the clockwise direction of the dynamic pressure generation grooves 121Y.

In addition, in the abutment joint part 110Y, a gap is formed between the end surface 115Y on the side of the inner peripheral surface on the one side and the end surface 116Y on the side of the inner periphery on the other side via the cutting part. Accordingly, there is a likelihood that foreign matter intrudes from the gap. However, in the present example, foreign matter intruding into the gap of the abutment joint part 110Y is discharged to the side of the inner peripheral surface of the seal ring 100Y by the foreign matter discharging grooves 130Y as described above.

<Excellent Point of Seal Ring According to Twelfth Example>

As described above, the seal ring 100Y according to the present example has the foreign matter discharging grooves 130Y, which range from the inner peripheral surface to the end surfaces of the abutment joint part 110Y, on the side of the sliding surface sliding on the lateral wall surface 211 of the annular groove 210. Accordingly, even if foreign matter intrudes into the gap of the abutment joint part 110Y, the foreign matter is discharged to the side of the inner peripheral surface of the seal ring 100Y by the foreign matter discharging grooves 130Y. Therefore, the intrusion of foreign matter into the dynamic pressure generation grooves 121Y can be prevented. Thus, the impairment of the dynamic pressure generation function of the dynamic pressure generation grooves 121Y due to foreign matter can be prevented, and the acceleration of wear-out due to foreign matter can be prevented.

In addition, in the present example, the foreign matter discharging holes 130Y are provided on both sides of the abutment joint part 110Y in the circumferential direction. Thus, foreign matter is discharged to the side of the inner peripheral surface of the seal ring 100Y by the foreign matter discharging grooves 130Y regardless of the rotating direction of the seal ring 100Y relative to the annular groove 210.

(Other)

In the above twelfth example, the groove parts 120Y and the foreign matter discharging grooves 130Y are provided only on one surface of the seal ring 100Y. However, the groove parts 120Y and the foreign matter discharging grooves 130Y may be provided on both surfaces of the seal ring 100Y. In short, a surface on which the groove parts 120Y and the foreign matter discharging grooves 130Y are provided may serve as a sliding surface.

REFERENCE SIGNS LIST

100 Seal ring
110 Abutment joint part
111 First fitting convex part
112 Second fitting convex part
113 Second fitting concave part
114 First fitting concave part
115 End surface
116 End surface
120 Groove part
121 Dynamic pressure generation groove
122 Introduction groove
130, 131, 132, 133 Foreign matter discharging groove
133a Foreign matter introduction groove
133b, 133c, 133d Auxiliary dynamic pressure generation groove
200 Shaft
210 Annular groove
211 Lateral wall surface
300 Housing
S Sliding region
100X Seal ring
110X Abutment joint part
111X First fitting convex part
112X Second fitting convex part
113X Second fitting concave part
114X First fitting concave part
115X End surface
116X End surface
120X Groove part
121X Dynamic pressure generation groove
122X Introduction groove
130X, 131X, 132X Foreign matter discharging hole
131Xa, 131Xb, 131Xc, 131Xd Inclined surface
100Y Seal ring
110Y Abutment joint part
111Y First fitting convex part
112Y Second fitting convex part
113Y Second fitting concave part
114Y First fitting concave part
115Y End surface
116Y End surface
120Y Groove part
121Y Dynamic pressure generation groove
122Y Introduction groove
130Y Foreign matter discharging groove

The invention claimed is:

1. A seal ring that is attached to an annular groove provided on an outer periphery of a shaft and seals an annular gap between the shaft and a housing that rotate relative to each other, to maintain fluid pressure in a sealed region in which the fluid pressure is configured to change,
the seal ring sliding on a lateral wall surface of the annular groove on a lower pressure side,
the seal ring comprising:
an abutment joint part provided at one portion in a circumferential direction thereof;
a plurality of dynamic pressure generation grooves provided at intervals in the circumferential direction on a side of a sliding surface thereof sliding on the lateral wall surface; and
foreign matter discharging holes that are provided between a region in which the plurality of dynamic pressure generation grooves is arranged and the abutment joint part in the circumferential direction on the side of the sliding surface sliding on the lateral wall surface, and that are capable of catching foreign matter intruding from the abutment joint part and discharging the caught foreign matter to a side of an inner peripheral surface of the seal ring.

2. The seal ring according to claim 1, wherein the foreign matter discharging holes each have a groove depth greater than the groove depth of the dynamic pressure generation grooves.

3. The seal ring according to claim 1, wherein the foreign matter discharging holes are provided on both sides of the abutment joint part in the circumferential direction.

4. The seal ring according to claim 1, wherein the foreign matter discharging holes are provided at a position that falls within a sliding region in which the seal ring slides on the lateral wall surface.

5. The seal ring according to claim 1, wherein, the foreign matter discharging holes are configured such that an inclined surface on a side closer to an outer peripheral surface relative to a deepest position has greater inclination than inclination of an inclined surface on the side of the inner peripheral surface, and that an inclined surface on a side opposite to the abutment joint part relative to the deepest position has greater inclination than inclination of an inclined surface on a side of the abutment joint part.

6. A seal ring that is attached to an annular groove provided on an outer periphery of a shaft and seals an annular gap between the shaft and a housing that rotate relative to each other, to maintain fluid pressure in a sealed region in which the fluid pressure is configured to change,
the seal ring sliding on a lateral wall surface of the annular groove on a lower pressure side,
the seal ring comprising:
an abutment joint part provided at one portion in a circumferential direction thereof;

a plurality of dynamic pressure generation grooves provided at intervals in the circumferential direction on a side of a sliding surface thereof sliding on the lateral wall surface; and foreign matter discharging grooves provided on the side of the sliding surface sliding on the lateral wall surface and ranging from an inner peripheral surface to end surfaces of the abutment joint part.

7. The seal ring according to claim 6, wherein the foreign matter discharging grooves each have a groove depth greater than the groove depth of the dynamic pressure generation grooves.

8. The seal ring according to claim 6, wherein the foreign matter discharging grooves are provided on both sides of the abutment joint part in the circumferential direction.

* * * * *